US008050267B2

(12) United States Patent
Townsley et al.

(10) Patent No.: US 8,050,267 B2
(45) Date of Patent: Nov. 1, 2011

(54) SIMPLE VIRTUAL PRIVATE NETWORK FOR SMALL LOCAL AREA NETWORKS

(75) Inventors: William Mark Townsley, Pensacola, FL (US); Earl Hardin Booth, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 444 days.

(21) Appl. No.: 11/676,444

(22) Filed: Feb. 19, 2007

(65) Prior Publication Data

US 2008/0198858 A1 Aug. 21, 2008

(51) Int. Cl.
    *H04L 12/56* (2006.01)
(52) U.S. Cl. .......................... 370/392; 370/401
(58) Field of Classification Search .................. None
    See application file for complete search history.

(56) References Cited

U.S. PATENT DOCUMENTS

| | | | | |
|---|---|---|---|---|
| 6,765,881 | B1 * | 7/2004 | Rajakarunanayake | 370/256 |
| 6,781,982 | B1 * | 8/2004 | Borella et al. | 370/352 |
| 7,099,319 | B2 * | 8/2006 | Boden et al. | 370/389 |
| 7,366,188 | B2 * | 4/2008 | Kim | 370/401 |
| 7,505,402 | B2 * | 3/2009 | Filsfils et al. | 370/217 |
| 2006/0171397 | A1 * | 8/2006 | Watkinson | 370/395.2 |

OTHER PUBLICATIONS

AT&T, Understanding VPN Technology Choices, www.business.att.com/content/whitepaper/Understandingvpntechnology.pdf, Aug. 24, 2006, p. 3pp, Publisher: AT&T knowledge Ventures, Published in: San Antonio, TX USA.

S. Cheshire and M. Krochmal, DNS-Based Service Discovery, www.ietf.org/internet-drafts/draft-cheshire-dnsext-dns-sd-04.txt, Aug. 28, 2006, p. 39pp. Publisher: Internet Engineering Task Force, Published in: Internet.
Javin, Layer 2 Ethernet VPN and Virtual Private LAN Service (VPLS), www.networkdictionary.com/networking/Layer2EthernetVPN.php, Feb. 14, 2007, p. 2pp, Publisher: Javin Technologies, Inc., Published in: Saratoga, CA, USA.
B. Aboba, D. Thaler, Esibov, Link-Local Multicast Name Resolution (LLMNR), rfc4795.txt, Jan. 1, 2007, p. 31pp, Publisher: Internet Engineering Task Force, Published in: Internet www.ietforg/rfc/.
Lau, J. et al., "Layer Two Tunneling Protocol—Version 3 (L2TPv3)," Network Working Group RFC 3931, Mar. 2005, 95 pages http://tools.ietf.org/html/rfc3931.
Hoffman, P. et al., "Nameprep: A Stringprep Profile for Internationalized Domain Names (IDN)," Network Working Groupo RFC 3491, Mar. 2003, 8 pages http://tools.ietf.org/html/rfc3491.

* cited by examiner

*Primary Examiner* — Chirag Shah
*Assistant Examiner* — Steve Young
(74) *Attorney, Agent, or Firm* — Patent Capital Group

(57) ABSTRACT

In one embodiment, a method includes establishing a control channel across a wide area network (WAN) from a first gateway that has a first public internetwork layer (L3) address to a second gateway that has a second public L3 address. Each gateway connects a local area network (LAN) to the WAN. Negotiations over the control channel establish a first set of private L3 addresses for the first LAN and a non-overlapping second set for the second LAN. A different address from the first set is provided for each different node in the first LAN. A discovery packet is received from the first LAN. The discovery packet is encapsulated in a tunnel packet directed to the second public L3 address. The tunnel packet is sent over the WAN to the second gateway which extracts the discovery packet. The second gateway sends the discovery packet over the second LAN.

32 Claims, 10 Drawing Sheets

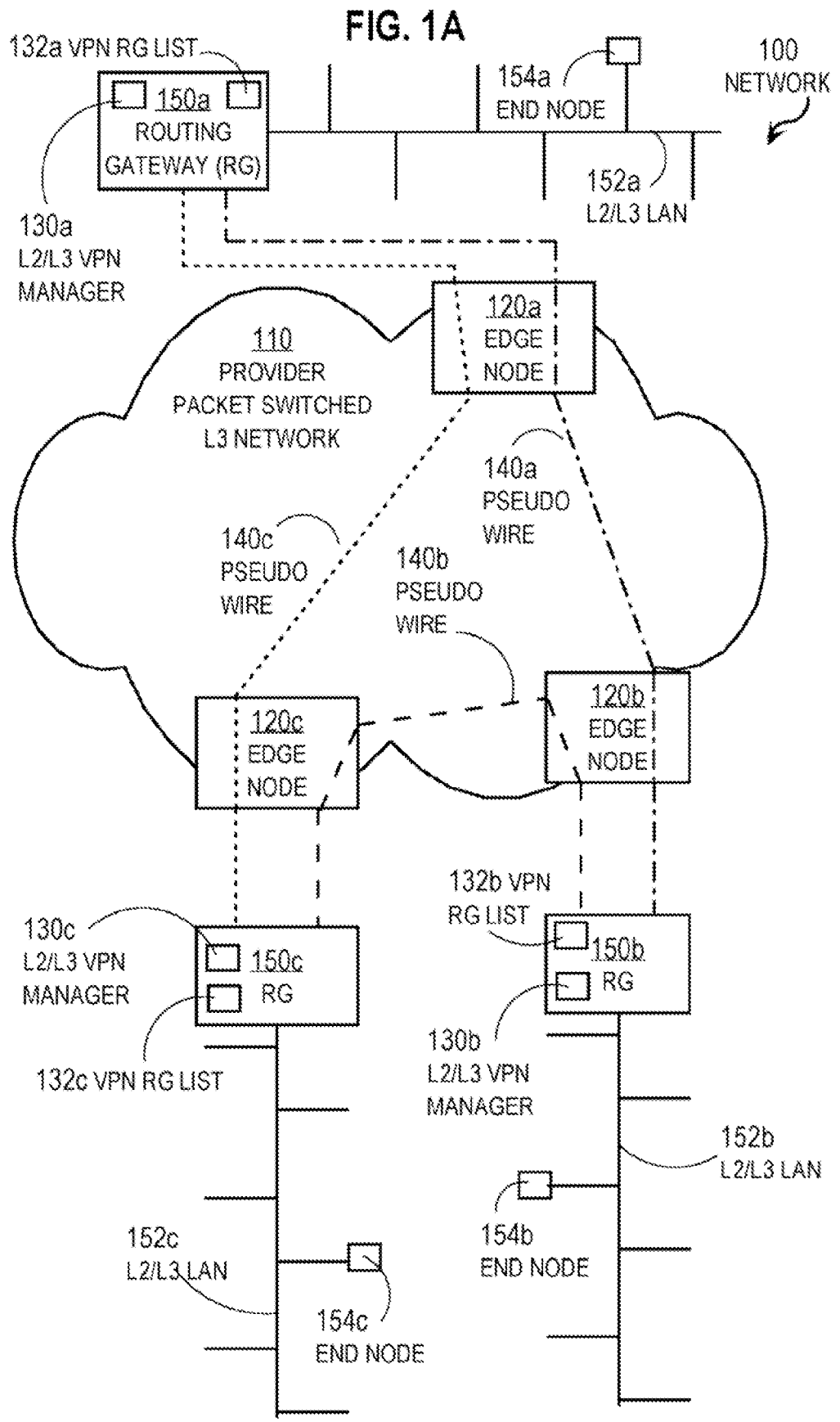

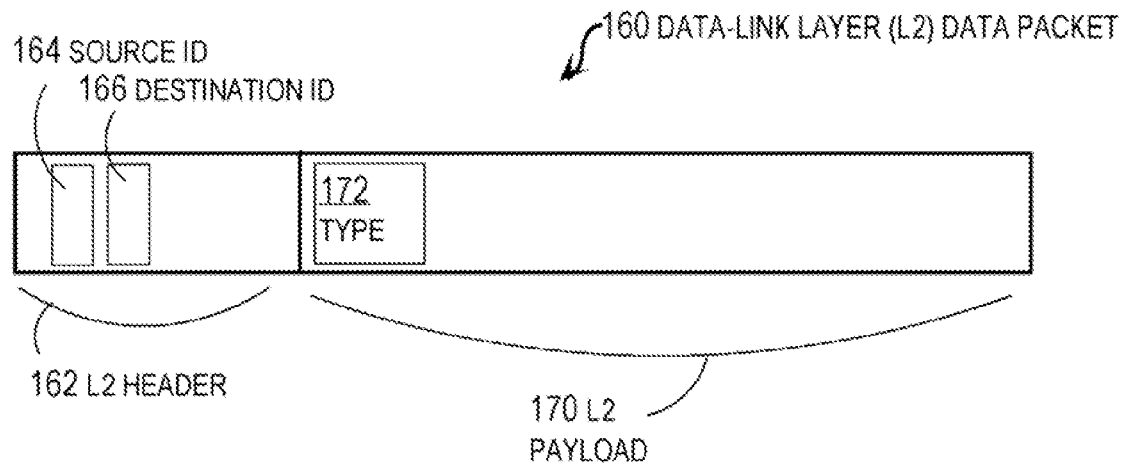
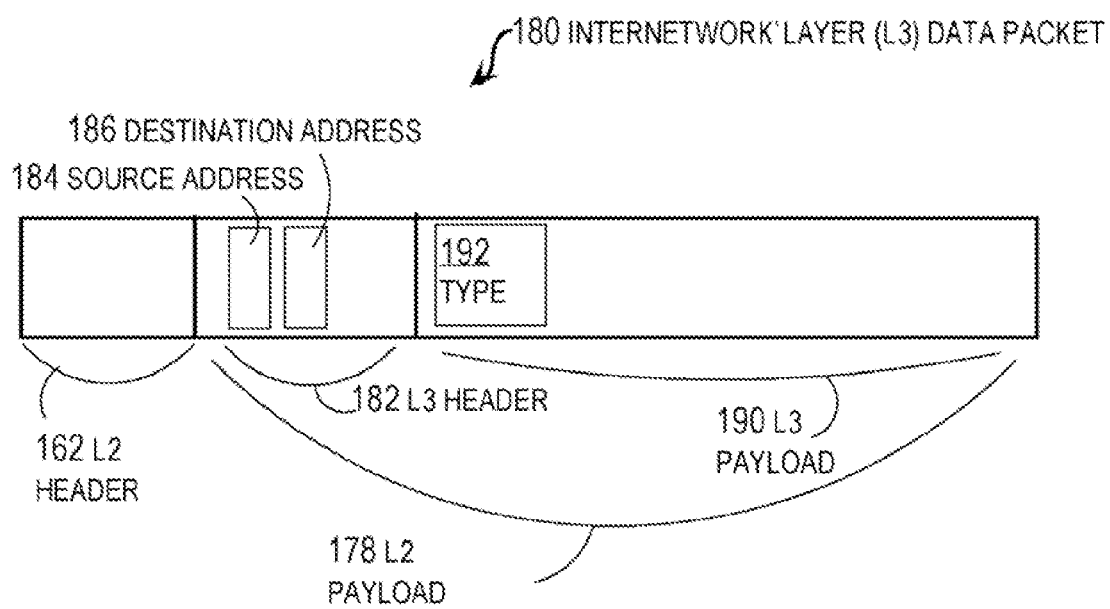

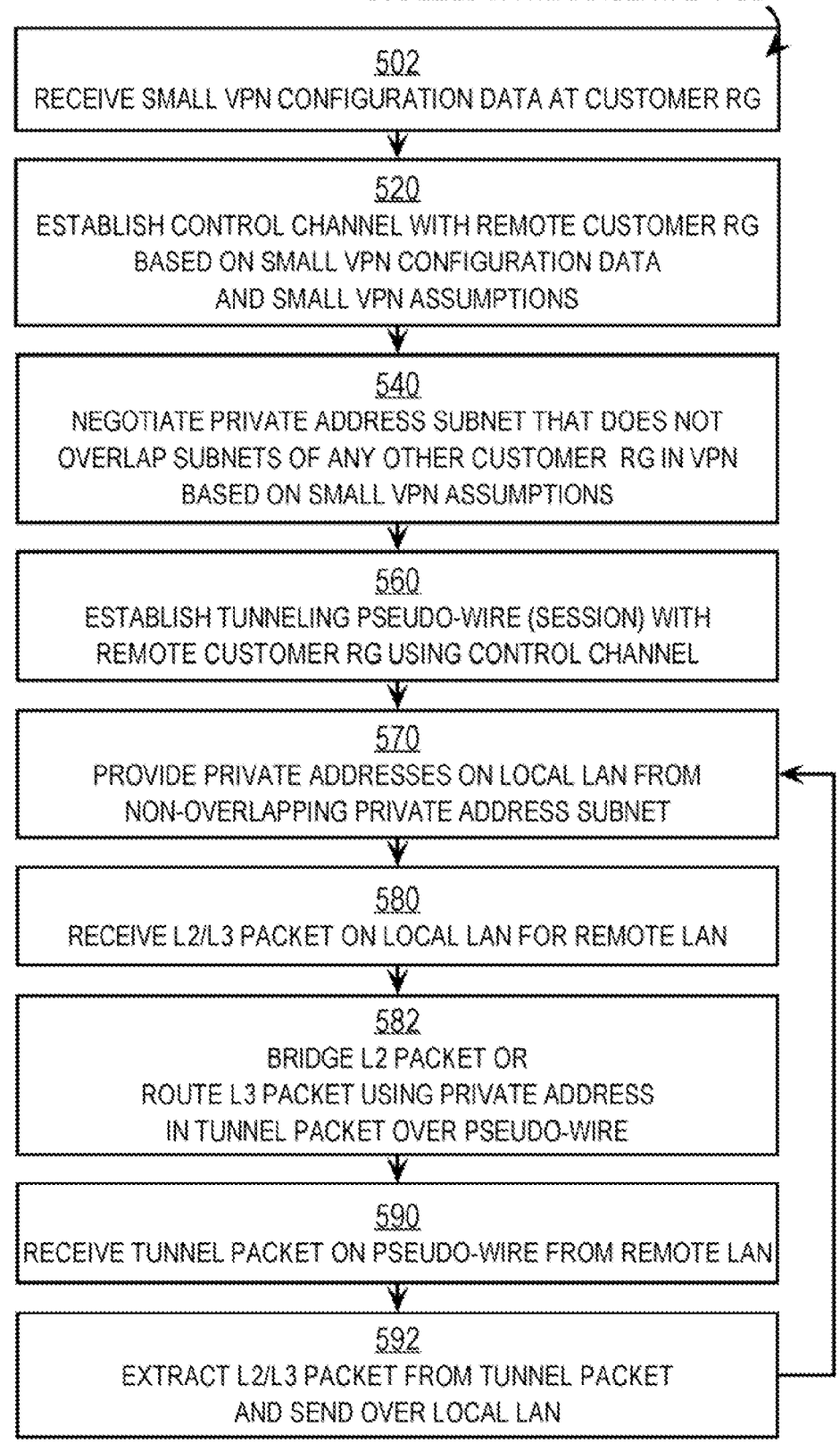

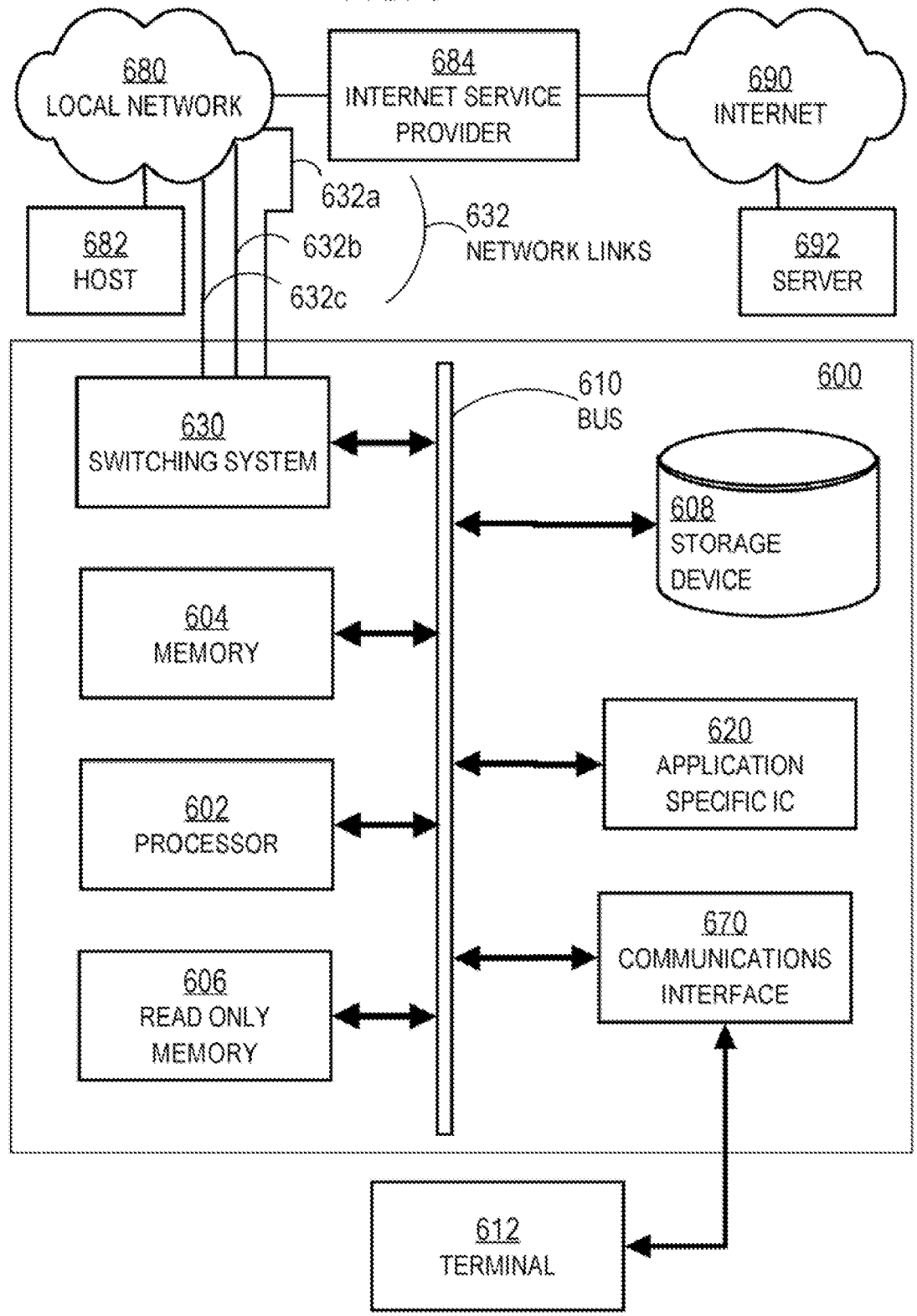

SIMPLE VIRTUAL PRIVATE NETWORK FOR SMALL LOCAL AREA NETWORKS

BACKGROUND OF THE INVENTION

1. Field of the Invention

The present invention relates to a virtual private network within a larger area network, and in particular to a virtual private network that is simple to establish and maintain so that it is suitable for residential and small office use.

2. Description of the Related Art

Networks of general purpose computer systems and other devices connected by external communication links are well known and widely used in commerce. The networks often include one or more network devices that facilitate the passage of information between the computer systems. A network node is a network device or computer system connected by the communication links. As used herein, an end node is a network node that is configured to originate or terminate communications over the network. In contrast, an intermediate network node facilitates the passage of data between end nodes Small office and residential home networks are made up of an increasing number of networked devices. These include computers, printers, facsimile machines, Internet telephones, cameras, players for audio and video digital data, and digital data storage devices, among others. These devices may be used to connect to the Internet, or to communicate with one another on a given home or small office local area network (LAN).

It is often cumbersome for a user to share device-to-device connectivity when the devices are not physically located on the same LAN.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1A illustrates an example network with devices on different LANs;

FIG. 1B illustrates an example data-link layer data packet;

FIG. 1C illustrates an example internetwork-layer data packet;

FIG. 5A illustrates an example method on customer premises equipment that makes establishment of a virtual private network simple for small LANs;

FIG. 6 illustrates a computer system upon which an embodiment of the invention may be implemented.

DESCRIPTION OF EXAMPLE EMBODIMENTS

Figure 2:
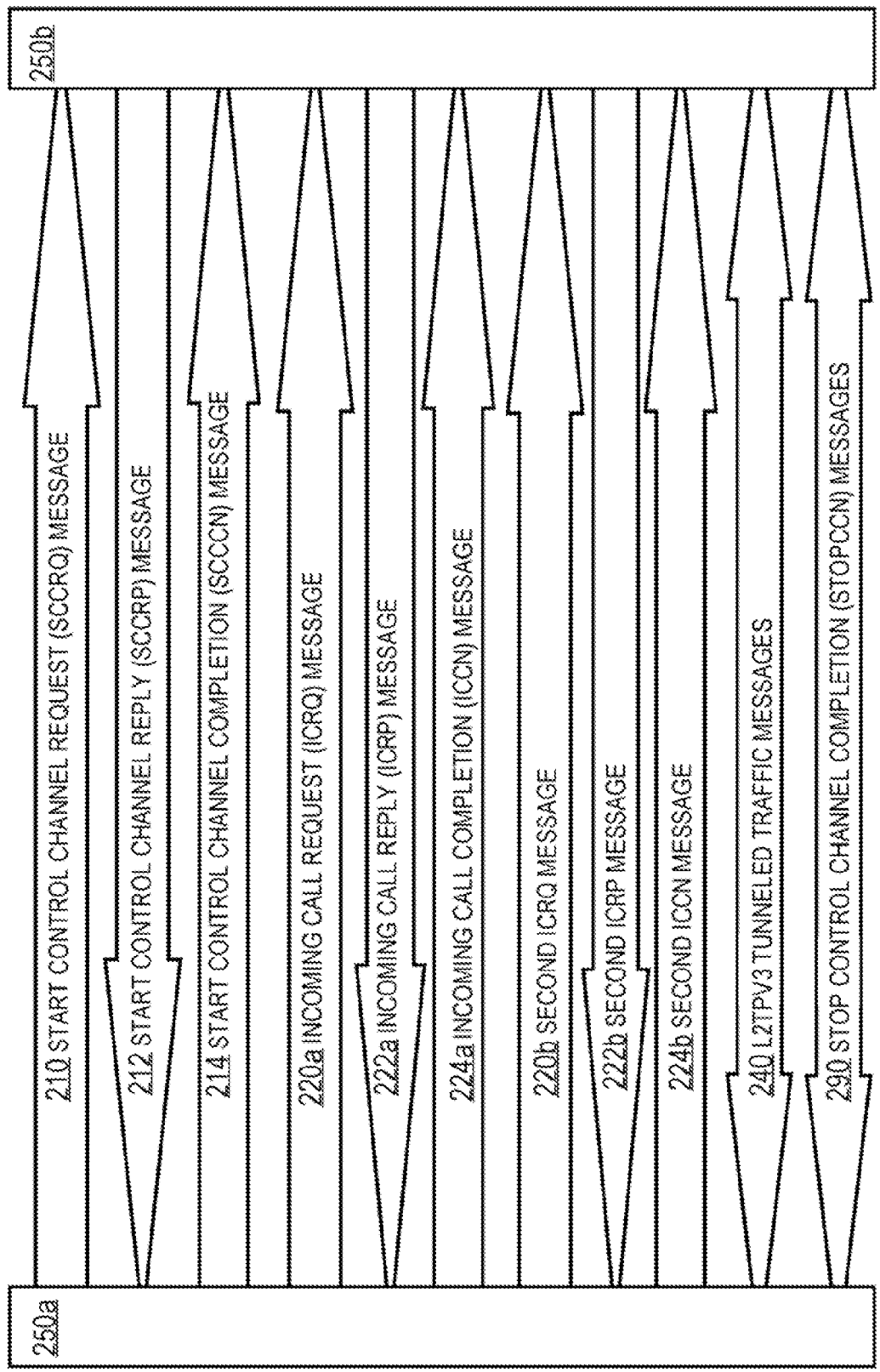
FIG. 2 illustrates an example exchange of data packets to establish persistent tunnels called pseudo wires using the L2TPv3 standard.

Techniques are described for forming a simple virtual private network (VPN). In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

1.0 Overview

In one set of embodiments, a method includes establishing a control channel across a wide area network from a first gateway node that has a first public internetwork layer (L3) address to a different second gateway node that has a different, second public L3 address. The first gateway node connects a first local area network (LAN) to the wide area network. The second gateway node connects a different second LAN to the wide area network. Messages are exchanged with the second gateway node over the control channel to negotiate a first set of private L3 addresses for the first LAN and a second set of private L3 address for the second LAN, in which no address in the first set is also in the second set. A different private IP from the first set is provided for each different node in the first LAN. When a discovery packet is received at the first gateway node from the first LAN, the discovery packet is encapsulated in a tunnel packet with a destination L3 address that, indicates the second public L3 address. A discovery packet is a data packet that requests an identifier or service associated with nodes on a LAN. The tunnel packet is sent over the wide area network to be delivered to the second gateway node. At the second gateway node, the discovery packet is extracted from the tunnel packet and sent over the second LAN Both data-link layer (L2) and internetwork-layer (L3) discovery packets are forwarded to the second LAN.

In other sets of embodiments, an apparatus or logic encoded in a tangible medium performs one or more steps of the above method.

2.0 Network Overview

Information is exchanged between network nodes according to one or more of many well known, new or still developing protocols. In this context, a "protocol" consists of a set of rules defining how the nodes interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model. The OSI Reference Model is generally described in more detail in Section 1.1 of the reference book entitled *Interconnections Second Edition*, by Radia Perlman, published September 1999, which is hereby incorporated by reference as though fully set forth herein.

Communications between nodes are typically effected by exchanging discrete packets of data. Each packet typically comprises 1] header information associated with a particular protocol, and 2] payload information that follows the header information and contains information that may be processed independently of that particular protocol. In some protocols, the packet includes 3] trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, usually higher layer of the OSI Reference Model. The header for a particular protocol typically indicates a type for the next protocol contained in its payload. The payload protocol is said to be encapsulated in the header protocol. In network parlance, a tunnel for data is simply a protocol that encapsulates that data. The headers included in a packet traversing multiple heterogeneous networks, such as the Internet, typically include a physical (layer 1) header, a data-link (layer 2) header, an internetwork (layer 3) header and a transport (layer 4) header, as defined by the Open Systems Interconnection (OSI) Reference Model.

The Internet Protocol (IP) is an internetwork layer protocol that assigns logical addresses to network nodes, which are easily nested in subnetworks of contiguous addresses. IP version 4 (IPv4) addresses are the most widely used and are represented by four octets of binary digits (bits); each octet is 8 bits that represent decimal values from 0 through 255 Thus an IPv4 address has 32 bits. IPv4 supports $2^{32}$ (about 4.3 billion) addresses, which is inadequate for giving even one address to every living person, much less for supporting a separate address for each connected device. This shortage is currently mitigated by the use of public IP addresses that are not used by more than one device at one time and private IP addresses that are re-used on several different private networks at the same time. For example, IPv4 addresses with a first octet having a decimal value of 10 or 192 are reserved for private addresses and are not used on the public Internet. These addresses are used over and over again on different private networks, such as local area networks (LANs), which are not connected to each other. The private networks using private IP addresses can be connected to the public Internet using technologies such as network address translation (NAT). A NAT process executing on an intermediate network node with a public IPv4 address associates different ports included in a transport (layer 4) header received at the node with different devices on a LAN that might have different private IPv4 addresses.

While NAT extends the usefulness of IPv4 addresses, it can interfere with discovery and communication among network nodes on different LANs. IP broadcast and link-local multicast discovery mechanisms currently are widely used to "find" devices on a given LAN. Existing methods to share devices connected on a home LAN behind a single IPv4 NAT and firewall connection to the Internet are cumbersome, requiring application-specific port-forwarding configuration to be applied for each application and each device. Even when this is setup properly by a skilled user, layer 2 (L2) based protocols or discovery protocols that rely on broadcast and link-local multicast will not operate beyond the confines of the typical home or small office LAN. Examples of such L2 based protocols include the multicast Domain Name Server (mDNS) protocol and the Bonjour protocol of APPLE™ Inc., Link-local Multicast Name Resolution (LLMNR) of MICROSOFT™ Corp, and proprietary protocols from game console or video set top box (STB) and digital or personal video recorder (DVR or PVR) manufacturers, and older WINDOWS™ operating system file and printer sharing protocols from MICROSOFT™ Corp. based on Network Basic Input/Output System Extended User Interface (NetBEUI), among others.

Thus, a user with a video program on a DVR or a music file on an IPOD™ connected to a home network can not visit a relative with similar equipment on a similar network and easily connect to the home network PVR or IPOD™ to access that program or music file. Similarly, a small company owner with high quality printer, data storage device and facsimile machine connected to a small office network can not connect her laptop to a home LAN and easily access that printer and facsimile machine or retrieve files from that data storage device.

A virtual private network (VPN) is a technology to logically separate the data packets traveling over the same physical network, so that a user of one VPN does not see the data communicated between users of a different VPN. A network service provider (SP, such as an Internet service provider, ISP) frequently offers to customers VPNs that are implemented as one or more tunnels (also called pseudo wires) on a packet switched network (PSN) infrastructure, such as a network of routers using the Internet Protocol (IP) as a layer 3 protocol. Then layer 2 protocols, such as Ethernet, are used in persistent tunnels to transmit customer data over a VPN.

A business customer typically contracts with an SP to provide a VPN among multiple customer sites and branch offices to support certain kinds and amounts of data traffic over that VPN. In response, the ISP configures interfaces to customer equipment on several intermediate network nodes at the edge of an ISP network (so-called "provider edge nodes;" PE, or simply "edge nodes"). Each interface is configured to communicate the type of traffic designated for that interface and encapsulate it in one or more tunnels, each tunnel directed to one of one or more other interfaces on other edge nodes of the ISP network. In the parlance of this technology, configuring each affected interlace on each affected edge node provisions the VPN.

A PE interface to customer equipment (CE) is called an attachment circuit (AC) or port. Each physical interface can support one or more logical attachment circuits. Configuration data specifies values for one or more parameters for each attachment circuit (AC). The parameters and values depend on the layer 2 protocol to be supported in the VPN, the topology of the VPN, and the tunneling protocol that provides the pseudo wires.

Currently, provisioning the VPN is a manual process, in which an SP network administrator determines which data packets on each interface are sent out on which link to the provider network using which pseudo wire. The manual provisioning process is tedious and error prone. Furthermore, when a new piece of customer equipment is connected to an edge node, that equipment is unable to communicate over the VPN unless and until the human administrator provisions the VPN to add the new interface. Thus the process is subject to delays. The delays grow in severity as the human administrator becomes busier. The tedium and propensity for error increase with the complexity of the VPN topology (e.g., as the numbers of interfaces and edge nodes increase).

According to an illustrated embodiment of the invention, a hybrid layer 2 and layer 3 virtual private network (L2/L3 VPN) is established easily without SP involvement between intermediate network nodes on customer premises equipment, rather than SP edge nodes, to support L2 and L3 discovery and data exchange among nodes on a limited multiple number of LANs separated by the Public Internet. This L2/L3 VPN is also called herein a simple VPN for small LANs.

Although the illustrated embodiment is described in this context using a particular tunneling protocol with IP at layer 3 and Ethernet at layer 2, in other embodiments, another tunneling protocol is used between nodes on LANs at one or more SP premises or customer premises or both, using a different layer 2 protocol or layer 3 protocol or both.

2.1 Example Network

FIG. 1A illustrates an example network 100 with devices on different. LANs. Network 100 includes a service provider packet switched layer 3 (L3) subnetwork 110 and three layer 2 or layer 3 or both (L2/L3) local area networks (LANs) 152a, 152b, 152c (among others, collectively referenced hereinafter as LAN 152).

The subnetwork 110 includes edge nodes 120a, 120b, 120c (among others, collectively referenced hereinafter as edge node 120). Edge nodes 120 are intermediate network nodes on SP premises that are connected to customer premises equipment via attachment circuits.

The LANs 152 include end nodes 154a, 154b, 154c (among others, collectively referenced hereinafter as end node 154) and routing gateway nodes. The LANs 152 are connected to corresponding edge nodes 120 on subnetwork 110 via corresponding routing gateway nodes 150a, 150b, 150c (among others, collectively referenced hereinafter as routing gateway, RG 150). A RG 150 is an intermediate network node on customer premises, which is connected to SP equipment edge nodes 120 via one or more attachment circuits. RG 150 includes a network address translation (NAT) process to communicate L3 traffic between subnetwork 110 and end nodes 154. Commercial off the self devices suitable to serve as RGs 150 include home wired and wireless routers, such as those sold by LINKSYS™, of Irvine, Calif., a division of CISCO SYSTEMS™, Inc., of San Jose, Calif., for wireless and Ethernet networking for home. Small Office, Home Office (SOHO) and small business users.

According to the illustrated embodiment, each RG 150 also includes an L2/L3 VPN manager process, such as L2/L3 VPN manager processes 130a, 130b, 130c (among others, collectively referenced hereinafter as L2/L3 VPN manager process 130). As described in more detail below, each L2/L3 VPN manager process 130 establishes a persistent tunnel (i.e., a pseudo wire) with each of certain other RGs that share a secret, such as a common password. The collection of pseudo wires for one common secret constitutes a VPN. According to various embodiments, L2/L3 VPN is formed without service provider involvement and with much less effort and knowledge by a customer than is usually involved in establishing a VPN by a service provider. In the illustrated embodiment RG 150a, RG 150b and RG 150c establish pseudo wires 140a, 140b, 140c for a simple VPN to tunnel L2/L3 traffic between LANs 152a, 152b, 152c. Each L2/L3 VPN manager process 130 stores a list of RGs that it knows belong to the VPN, designated a VPN RG list, such as VPN RG lists 132a, 132b, 132c (among others, collectively referenced hereinafter as VPN RG list 132).

2.2 Example Lan Packets

FIG. 1B illustrates an example data-link layer (L2) data packet 160. The packet 160 includes a data-link layer (L2) header 162 and a L2 payload 170. The L2 header 162 includes a source identifier (ID) field 164 and destination ID field 166. The source ID field 164 holds data that uniquely identifies a node that sent the L2 packet. For example in an Ethernet L2 header, the source ID field holds a Media Access Control (MAC) value that is unique among manufactured network devices. The destination ID field 164 holds data that uniquely identifies a node that is to process the L2 payload 170 of the L2 packet 160. The L2 payload 170 includes a type field 172 that indicates the type of L2 packet 160. An L2 data packet placed on a LAN is seen by all nodes on a LAN segment between intermediate network nodes; but is only processed by a node that is indicated by the destination ID field 166, or an intermediate node that can reach the node indicated in the destination ID field 166.

When the destination ID Indicates a node that is on a different LAN separated by an L3 subnetwork, the L2 packet is not processed by standard approaches. For example, an L2 data packet sent by end node 154a on LAN 152a with a destination ID field 166 that indicates the MAC value of end node 154b (on LAN 152b separated by L3 subnetwork 110) is not processed by any node on LAN 152a, including RG 152a, and does not reach the targeted end node 154b using standard approaches. Indeed, the end node 154a can not even automatically discover the existence of end node 154b using current approaches.

FIG. 1C illustrates an example internetwork layer (L3) data packet 180. The packet 180 includes a data-link layer (L2) header 162 and a L2 payload 178. The L2 payload 178 includes an internetwork layer (L3) header 182 and a L3 payload 190. The L3 header 182 includes a source address field 184 and destination address field 186. The source address field 184 holds data that indicates the L3 address (e.g., the IPv4 address) of the node that originally sent the L3 packet 180. The destination address field 184 holds data that indicates the L3 address (e.g., the IPv4 address) of the node that is to process the L3 payload. The L3 payload 190 includes a type field 192 that indicates the type of L3 packet 180. An L3 data packet placed on a LAN is routed by an intermediate node on the LAN.

For purposes of illustration it is assumed that RG 150a, 150b and 150c have public IPv4 addresses indicated by 9.0.0.1, 9.0.0.2 and 9.0.0.3, respectively, and can reach each other using standard L3 routing. It also assumed that nodes on LAN 152a are assigned private IPv4 addresses in the range from 192.0.0.0 through 192.0.0.255 (a range indicated by a mask over the first 3 octets, =24 bits, and designated by "/24" after the lowest address in the range, i.e., 192.0.0.0/24). For example, end node 154a has a private IP address 192.0.0.5. It is also assumed that nodes on LAN 152b are assigned private IPv4 addresses in the range 10.0.0.0/24. For example, end node 154b has a private IP address 10.0.0.3.

For example, an L3 data packet placed on LAN 152a by end node 154a has a source L3 address of 192.0.0.5 and is routed by RG 150a. When the destination address is a public L3 address (e.g., 9.1.1.1) RG 150a applies standard NAT processing and changes the contents of source address field 186 to indicate a public L3 address of the RG 150a (e.g., 9.0.0.0). The RG 150a associates a port value with the end node 154a, and places the associated port value in a transport header portion (not shown) of the IP payload 190. Return L3 packets with a source L3 address of 9.1.1.1 and a destination L3 address of 9.0.0.0 and that port value in a destination port are received by RG 150a using standard L3 routing. That packet is then routed by RG 150a based on that port number using standard NAT processing. RG 150a replaces the destination L3 address with the private L3 address 192.0.0.5 associated with that port and places the packet on LAN 152a, where it is processed by end node 154a.

When an L3 data packet placed on LAN 152a by end node 154a has a destination address that is a private L3 address (e.g., 10.0.0.3 of end node 154b) that is not on LAN 152a, the L3 packet is not processed by standard approaches, and does not reach end node 154b using standard approaches. Existing methods to share devices connected on a home LAN behind a single IP NAT and firewall connection to the Internet are cumbersome, requiring application-specific port-forwarding configuration to be applied for each application and each device. In such specialized approaches, complicated processes at RG 150*a* and RG 150*b* with complex configuration are employed to map private addresses to ports that work for such traffic, but such configuration is beyond the capacity of the typical casual user of a small office or home LAN.

3.0 Simple VPN

According to various embodiments, simple configuration data is used to automatically set up pseudo wires among RGs chosen to be joined in a simple VPN for small LANs To reduce the amount of configuration data to be supplied by a casual user, various simplifying assumptions are made to generate default values for several configuration parameters normally needed to set up a VPN.

Based on common broadband Internet access models, the following assumptions are made to set default values in the illustrated embodiment. In other embodiments, different assumptions are made.

1] The customer procures Internet service from a service provider different from the customer.
2] Each customer LAN is on customer premises connected to the Internet via a RG (such as a LINKSYS™ box) under the customer's administrative control.
3] Each RG has a single global IPv4 address, with the RG performing network address translation with or without port address translation (NAT/PAT) on behalf of all devices on the customer LAN.
4] The customer premises network consists of a single LAN with one subnet, and one active Internet connection.
5] The devices on the customer premises are configured to obtain an IP address dynamically via Dynamic Host Configuration Protocol (DHCP) from the RG acting as a DHCP server.
6] Target design scale is for relatively few devices in the home (less than 255), and relatively few homes in the VPN (about 10).
7] The customer LAN is Ethernet-based (wired or unwired).
8] Devices do not actively roam from one customer premises LAN to another in a VPN without having to change their IP address.
9] The public IP address for an RG at a given customer premises may change periodically, but does not do so rapidly; or the pubic IP address is known via a domain name server, DNS, or Dynamic DNS.

3.1 Example Tunneling Protocol

Any tunneling may be used to move LAN traffic between customer premises LANs. Much of the administrative needs of forming and maintaining persistent tunnels (pseudo wires) is worked out by extant tunneling protocols Typically, a control channel is set up between nodes that tunnel other traffic so that those nodes can agree on the type and protocols and parameters for the data being tunneled.

In the illustrated embodiment, the layer 2 tunneling protocol version 3 (L2TPv3) is used. L2TP is a data-link layer (layer 2) protocol established to provide a persistent virtual circuit as a tunnel between two end nodes of a trusted subnetwork. L2TP facilitates the tunneling of point to point protocol (PPP) packets and L3 packets across an intervening network in a way that is as transparent as possible to both end-users and applications. More recent versions of L2TP, such as L2TPv3, facilitate tunneling of a number of data-link types, including, but not limited to, PPP, Frame Relay (FR), Asynchronous Transfer Mode (ATM), High Level Data Link Control (HDLC) and Ethernet. L2TP is described at the time of this writing in Internet Engineering Task Force (IETF) request for comments (RFC) 2661 which can be found in a file named rfc2661.txt, which can be found, along with other RFC files, at the World Wide Web domain www.ietf.org in the file directory named rfc. L2TPv3 is described in RFC 3931 available in file rfc3931.txt in the same directory. The entire contents of RFC 2661 and RFC 3931 are hereby incorporated by reference as if fully set forth herein.

Some protocols follow a layer 2 protocol and precede a layer 3 protocol; and are said to be layer 2.5 protocols. For example, the multi-protocol layer switch (MPLS) is a layer 2.5 protocol that provides for the designation, routing, forwarding and switching of traffic flows through a network and supports the transfer of multiple data-link (layer 2) types. MPLS is described at the time of this writing in IETF RFC 3031 and RFC 3032 which can be found in files named rfc3031.txt and rfc3031.tx, the entire contents of each of which are hereby incorporated by reference as if fully set forth herein.

FIG. 2 illustrates an example exchange of IP data packets across a L3 subnetwork (e.g., subnetwork 110) to establish pseudo wires using the L2TPv3 standard. Time increases downward in the diagram. An initiating node 250*a* invites a distant node 250*b* to establish one or more pseudo wires. Data packets exchanged are represented by arrows with arrowheads pointing in the direction of the data packed between nodes 250*a* and 250*b*.

First a control channel is established. Using the configuration data available, one network node 250*a* sends a Start Control Connection Request (SCCQ) message 210 in an IP data packet directed to a distant network node 250*b*. For example, RG 150*a* sends an SCCRQ message 210 to RG 150*b*. The SCCRQ message 210 includes an invitation to tunnel traffic and a challenge value used to authenticate the invited node 250*b* that receives the request. In response, the invited node 230*b* sends a Start Control Connection 1 Reply (SCCRP) message 212 in an IP data packet directed to the initiating node 150*a*. The SCCRP message 212 includes an authentication response based on a secret shared in the configuration data at the two nodes 250*a* and 250*b*. In the illustrated embodiment, the authentication response is an MD5 hash, well known in the art of network authentication, of the challenge concatenated with the shared secret. The SCCRP message 212 also includes a second challenge value. In response, the initiating node 230*a* sends a Start Control Connection Connected (SCCCN) message 214 in an IP data packet directed to the invited node 250*b*. The SCCCN message 214 includes an authentication response that is an MD5 hash of the second challenge value concatenated with the shared secret. Thus a two-way authentication is performed. In case both nodes send SCCRQ messages that cross in the intervening subnetwork, a tie-breaking option may be enforced in which the node with the smallest node identifier, e.g., IP address, is chosen as the inviting node 250*a*. If for any reason tunneling is to be halted or abandoned between the two nodes, one of the nodes sends a Stop Control Connection Notification (STOPCCN) message 290.

After the control channel is established between the two nodes, one or more pseudo wires is established. For each pseudo wire, a set of incoming call messages is exchanged. In the illustrated example, a first pseudo wire is established for tunneling a first type of data packets by sending a first Incoming Call Request ICRQ message 220*a* from one node to the other, e.g., from node 250*a* to node 250*b*, as depicted in FIG. 2. In response the receiving node 250*b* sends an Incoming Call Reply (ICRP) message 222*a*. In response, the original node 250*a* then sends an Incoming Call Completion (ICCN) message 224*a*. A second pseudo wire is established for tunneling a second type of data packets by exchanging a second set of ICRQ, ICRP and ICCN messages 220b, 222b, 224b.

Data traffic of the two types are then exchanged in L2TPv3 tunneled traffic messages 240 until the two nodes stop tunneling with one or more STOPCCN messages 290.

In some embodiments, based on the assumptions enumerated above, a single pseudo wire is established to pass Ethernet traffic; and all IP traffic is passed along with its Ethernet header in the pseudo wire for Ethernet traffic. According to the illustrated embodiment, one pseudo wire is established to pass Ethernet traffic and a second pseudo wire is established to pass IP traffic. An advantage of the illustrated embodiment is that the tunneled IP traffic does not include the Ethernet header, thus reducing packet size by 14 bytes. For tunneled LAN traffic that is predominantly IP traffic, such as streaming video and voice over IP, the savings in bandwidth can be substantial.

3.2 Modified Tunneling Protocol

According to some embodiments, the control channel messages are modified to discover information about membership in the simple VPN. This saves the casual customer from having to configure the VPN membership manually. In an illustrated embodiment the L2TPv3 SCCRQ and SCCRP messages are modified to pass information about the RGs known to belong to the VPN. The casual customer is required to know only an identifier for one of the RGs in the VPN, the others are determined automatically, as described in more detail in a later section. In an example used in the following, it is assumed that a customer at LAN 152a connected to RG 150a configures RG 150a with the public IPv4 address 9.0.0.2 of RG 150b, and a secret password shared only with RGs on LANs to be added to the VPN.

Figure 3A:
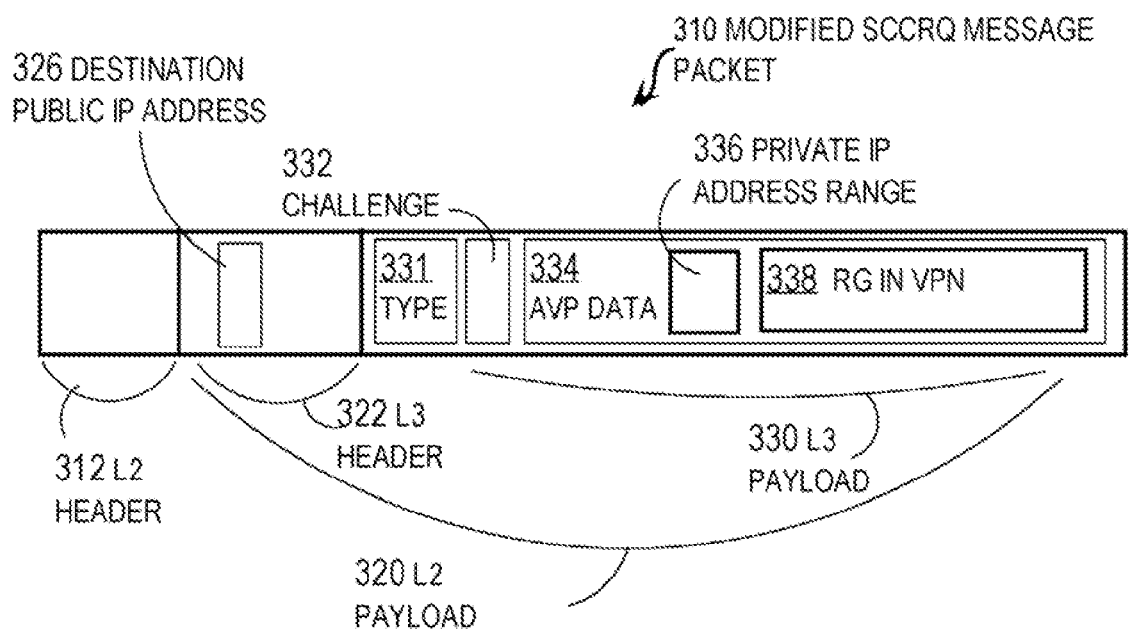
FIG. 3A illustrates an example modified Start Control Channel Request (SCCRQ) message to establish a control channel for a pseudo wire.

FIG. 3A illustrates an example modified Start Control Channel Request (SCCRQ) message 310 to establish a control channel for a pseudo wire. The packet 310 includes a data-link layer (L2) header 312, as described above, and a L2 payload 320. The L2 header is for use on an L3 subnetwork, such as IP subnetwork 110, and contains data that changes from hop to hop through the L3 subnetwork. The L2 payload 320 includes an internetwork layer (L3) header 322 and a L3 payload 330. The L3 header 322 includes a destination address field 326. The destination address field 326 holds data that indicates the public L3 address (e.g., the public IPv4 address) of the node that is to process the L3 payload (e.g., 9.0.0.2 for RG 150b). An L3 data packet placed on subnetwork 110 is routed by one or more intermediate nodes on the subnetwork 110, including edge node 120a and edge node 120b, according to standard routing protocols such as IP.

The L3 payload 330 includes a type field 331, a challenge field 332 and attribute-value pair (AVP) data fields 334. The type field 331 holds data that indicates the data packet 310 is an SCCRQ message packet 210. The challenge field 332 holds data that indicates a value to be used for authentication based on the shared secret password. The AVP data field 334 holds a series of data pairs in which the first data indicates an attribute and the second data indicates a value for that attribute. Several attributes are defined for a given standard, including the L2TPv3 standard.

According to the illustrated embodiment, the L2TPv3 standard is extended to include a private L3 address range attribute and a VPN member identifier attribute. In this embodiment, the AVP data 334 includes private IP address range field 336 and RG in VPN field 338. The private IP address range field 336 holds data that indicates a private IP address range that the sending RG has selected for its LAN. A method for choosing a private IP address range is described in more detail below. For example, private IP address range field 336 holds data that indicates the private L3 address range attribute and the value 192.0.0.0/24. The RG in VPN field 338 holds data that indicates identifiers for RGs that the sending RG 150 has associated with the VPN and stored in its VPN RG list 132. For example, based on configuration data provided by a customer at LAN 152a, the VPN RG list data structure 132a holds data that indicates identifiers for RG 150a and 150b, such as public IP addresses 9.0.0.1 and 9.0.0.2. In this example, RG in VPN field 338 holds two AVPs with data that indicates the VPN member identifier attribute and the values 9.0.0.1 and 9.0.0.2.

Figure 3B:
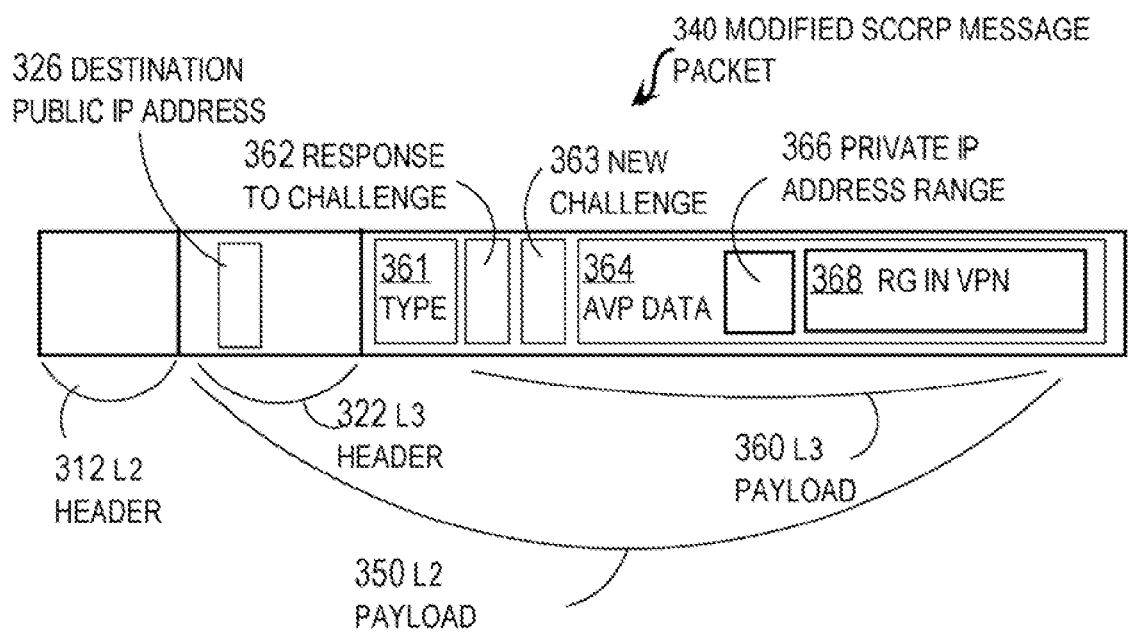
FIG. 3B illustrates an example modified Start Control Channel Reply (SCCRP) message to establish a control channel for a pseudo wire.

FIG. 3B illustrates an example modified Start Control Connection Reply (SCCRP) message 340 to establish a control channel for a pseudo wire. The packet 340 includes a data-link layer (L2) header 312, as described above, and a L2 payload 350. The L2 header 312 is for use on an L3 subnetwork, such as IP subnetwork 110, and contains data that changes from hop to hop through the L3 subnetwork. The L2 payload 350 includes an internetwork layer (L3) header 322 and a L3 payload 360. The L3 header 322 includes a destination address field 326, as described above. The destination address field 326 holds data that indicates the public L3 address (e.g., the public IPv4 address) of the node that is to process the L3 payload (e.g., 9.0.0.1 for RG 150a).

The L3 payload 360 includes a type field 361, a response to challenge field 362, a new challenge field 363 and attribute-value pair (AVP) data fields 364. The type field 361 holds data that indicates the data packet 340 is an SCCRP message packet 212. The response to challenge field 362 holds data that indicates the result of an MD5 hash of the value in challenge field 332 and the shared secret password, which, if correct, authenticates the invited node, e.g., RG 150b. The new challenge field 363 holds data that indicates a value to be used for authentication of the initiating node based on the shared secret password. The AVP data fields 364 include private IP address range field 366 and RG in VPN field 368. The private IP address range field 366 holds data that indicates a private IP address range that the sending RG has selected for its LAN. A method for choosing a private IP address range is described in more detail below. For example, private IP address range field 366 holds data that indicates the private L3 address range attribute and the value 192.0.7.0/24. The RG in VPN field 338 holds data that indicates identifiers for RGs that the sending RG 150 has associated with the VPN and stored in its VPN RG list data structure 132. For example, based on configuration data provided by a customer at LAN 152b, the VPN RG list 132b holds data that indicates identifier for RG 150b only, such as public IP address 9.0.0.2. In this example, RG in VPN field 338 holds one AVP with data that indicates the VPN member identifier attribute and the value 9.0.0.2.

Based on the information exchanged in packets 310 and 340, and unmodified SCCCN message 214, the RGs authenticate each other and obtain a list of all RGs known by either to be in the VPN. They also learn what private L3 addresses are used on each LAN. As described in more detail below, if there is a conflict in private IP address space, i.e., at least one private IP address appears in both ranges, then the channel setup is halted and restarted with the tie-breaker losing node, as determined by the tie-breaker options, selecting a different private IP address range.

In the illustrated embodiment, as mentioned above, incoming call messages are exchanged over the control channel between the two nodes to establish two pseudo wires, one for Ethernet traffic and one for IP traffic. In other embodiments two pseudo wires are established for a different combination of L2 and L3 protocols. In some embodiments, one pseudo wire is established for tunneling data packets with L2 headers, and L3 data packets, if any, just ride in the L2 payload of the tunneled L2 packets.

Figure 4A:
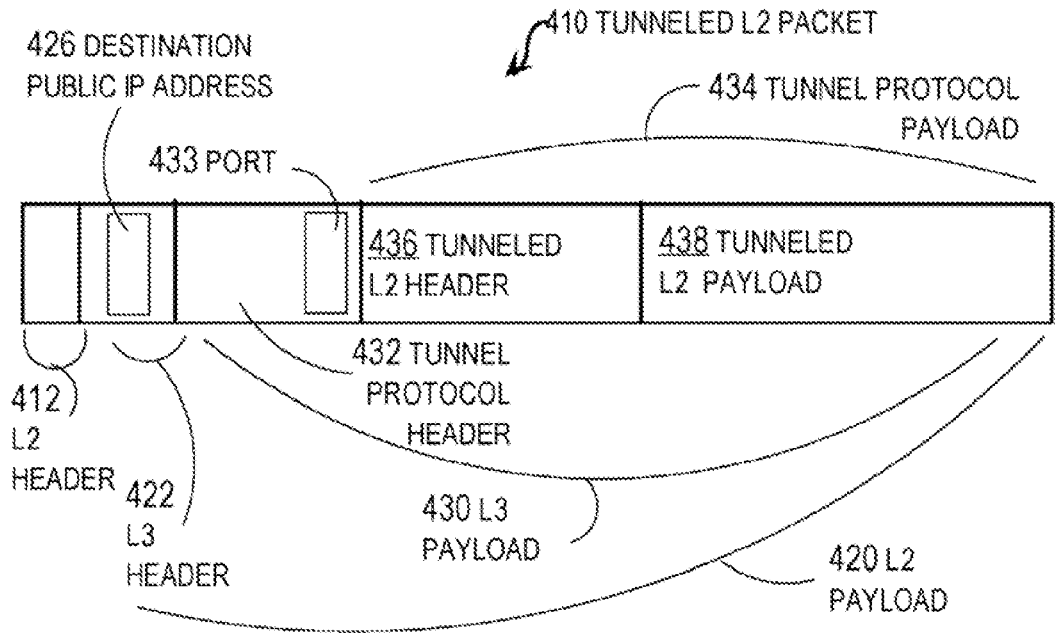
FIG. 4A illustrates an example tunneled data-link layer data packet on a pseudo wire.

FIG. 4A illustrates an example tunneled data-link layer (L2) data packet 410 on a pseudo wire. The packet 410 includes a data-link layer (L2) header 412, as described above, and a L2 payload 420. The L2 header is for use on an L3 subnetwork, such as IP subnetwork 110, and contains data that changes from hop to hop through the L3 subnetwork. The L2 payload 420 includes an internetwork layer (L3) header 422 and a L3 payload 430. The L3 header 422 includes a destination address field 426. The destination address field 426 holds data that indicates the public L3 address (e.g., the public IPv4 address) of the node that is to process the L3 payload (e.g., 9.0.0.2 for RG 150b). An L3 data packet placed on subnetwork 110 is routed by one or more intermediate nodes on the subnetwork 110, including edge node 120a and edge node 120b, according to standard routing protocols such as IP.

The L3 payload 430 includes a tunnel protocol header 432, such as an L2TPv3 header, and a funnel protocol payload 434. The tunnel protocol header 432 includes a port field 433 and a type field (not shown) that indicates the L3 payload 430 includes the tunneling protocol portion. The port field 433 holds data that indicates which of multiple pseudo wires between the two nodes this data packet belongs to. In L2TP terminology, the contents of the port field 433 are called a "Session ID." The Session ID is dynamically allocated in L2TP, and exchanged by ICRQ and ICRP messages. The Session ID is one value in a lookup table that tells about the pseudo wire, such as the type and the particular instance. The tunnel protocol payload 434 includes the tunneled L2 header 436 and the tunneled 12 payload 438. When the tunneled L2 packet. 410 is received at an RG indicated by the destination public IP address in field 426, that RG determines based on the value in port field 433 to strip off the tunnel protocol header 432 and outer headers 412 and 422, and place the tunneled L2 header 436 and payload 438 on its LAN. For example, when a tunneled L2 packet 410 sent from RG 150a is received at RG 150b indicated by the destination public IP address 9.0.0.2 in field 426, RG 150b determines to strip off the tunnel protocol header 432 and outer headers 412 and 422, and places the tunneled L2 header 436 and tunneled L2 payload 438 on its LAN 152b. In some embodiments the tunnel protocol payload 434 is encrypted, using an encryption protocol, such as IPSec, well known in the art of secure VPN.

In some embodiments, a tunneled L3 header and L3 payload are included in the tunneled L2 payload 438. In an illustrated embodiment, a tunneled L3 header and L3 payload are packed right after the tunnel protocol header 432, without a tunneled L2 header 436, as described next.

Figure 4B:
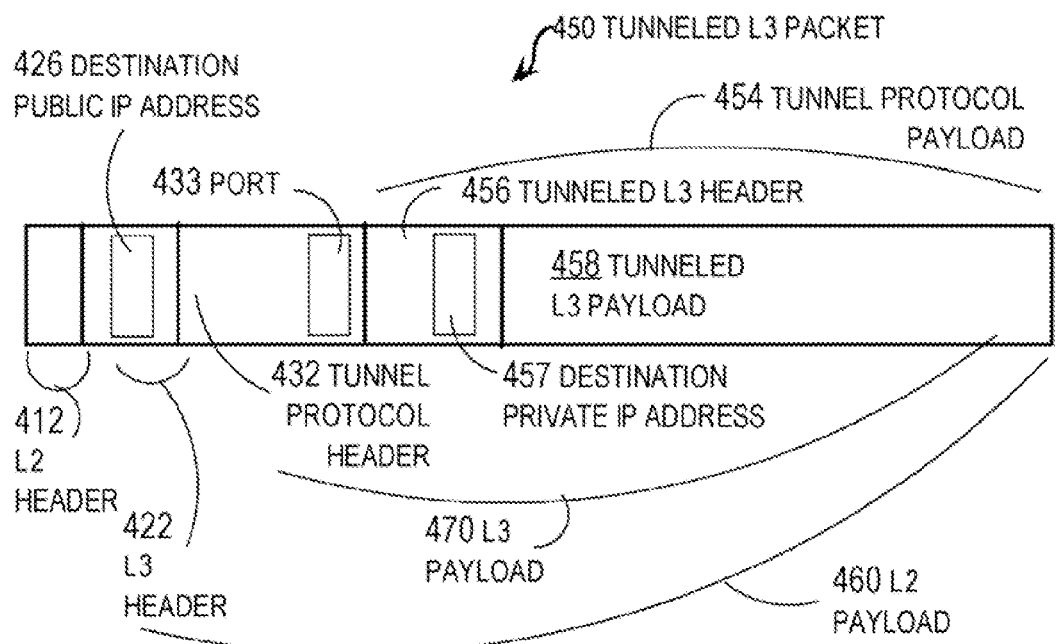
FIG. 4B illustrates an example tunneled internetwork-layer data packet on a pseudo wire.

FIG. 4B illustrates an example tunneled internetwork-layer (L3) data packet 450 on a pseudo wire. The packet 450 includes a data-link layer (L2) header 412, as described above, and a L2 payload 460. The L2 payload 460 includes an internetwork layer (L3) header 422 and a L3 payload 470. The L3 header 422 includes a destination address field 426. The destination address field 426 holds data that indicates the public L3 address (e.g., the public IPv4 address) of the node that is to process the L3 payload (e.g., 9.0.0.2 for KG 150b). An L3 data packet placed on subnetwork 110 is routed by one or more intermediate nodes on the subnetwork 110, including edge node 120a and edge node 120b, according to standard routing protocols such as IP.

The L3 payload 470 includes a tunnel protocol header 432, as described above, such as an L2TPv3 header, and a tunnel protocol payload 454 The tunnel protocol payload 454 includes the tunneled L3 header 456 and the tunneled L3 payload 458 but does not include a tunneled L2 header 436. The tunneled L3 header 456 includes a destination address field 457. The destination address field 457 holds data that indicates the private L3 address (e.g., the private IPv4 address) of the node that is to process the tunneled L3 payload (e.g., 192.0.7.3 for end node 154b). When the tunneled L3 packet 450 is received at an RG indicated by the destination public IP address in field 426, that RG determines based on the value in port field 433 to strip off the tunnel protocol header 432 and outer headers 412 and 422, and place the tunneled L3 header 456 and tunneled L3 payload 458 with a generated L2 header for its LAN onto its LAN. For example, when a tunneled L3 packet 450 sent from RG 150a is received at RG 150b indicated by the destination public IP address 9.0.0.2 in field 426, RG 150b determines to strip off the tunnel protocol header 432 and outer headers 412 and 422, add a L2 header for LAN 152b and place the tunneled L3 header 456 and payload 458 on its LAN 152b with the generated L2 header. The packet is routed to end node 154b based on the private IPv4 address, 192.0.7.3. In some embodiments the tunnel protocol payload 454 is encrypted, using an encryption protocol, such as IPSec, well known in the art of secure VPN.

4.0 Method at Customer Premises Gateway Node

According to an illustrated embodiment, each RG 150 connecting a LAN to the Internet is programmed with a L2/L3 VPN manager process 130 that may be used by a customer with very little configuration input by the customer to extend the customer's LAN to include devices on a different customer LAN connected to the Internet and belonging to the same customer or to a colleague, such as a co-worker, friend or family member.

FIG. 5A illustrates an example method 500 on customer premises equipment that makes establishment of a virtual private network simple for small LANs. Method 500 is an illustrated embodiment of L2/L3 VPN manager process 130. Although steps are depicted in FIG. 5 and in subsequent flow diagrams in a particular order for purposes of illustration, in other embodiments one or more steps are performed in a different order or overlapping in time by one or more processors acting in series or in parallel, or one or more steps are omitted, or one or more steps are added, or the method is changed in some combination of ways.

In step 502, simple VPN configuration data is received. Simple configuration is highly desirable. As such, in the illustrated embodiment, all configuration data for VPN generation is automated except for two manually input parameters. First, a secret password to be shared by customers of all LANs to be connected by the VPN should be input by the customer. Second, at least one customer should input an identifier for a RG at different premises to be joined to the VPN. Step 502 is described in more detail with reference to FIG. 5B.

Figure 5B:
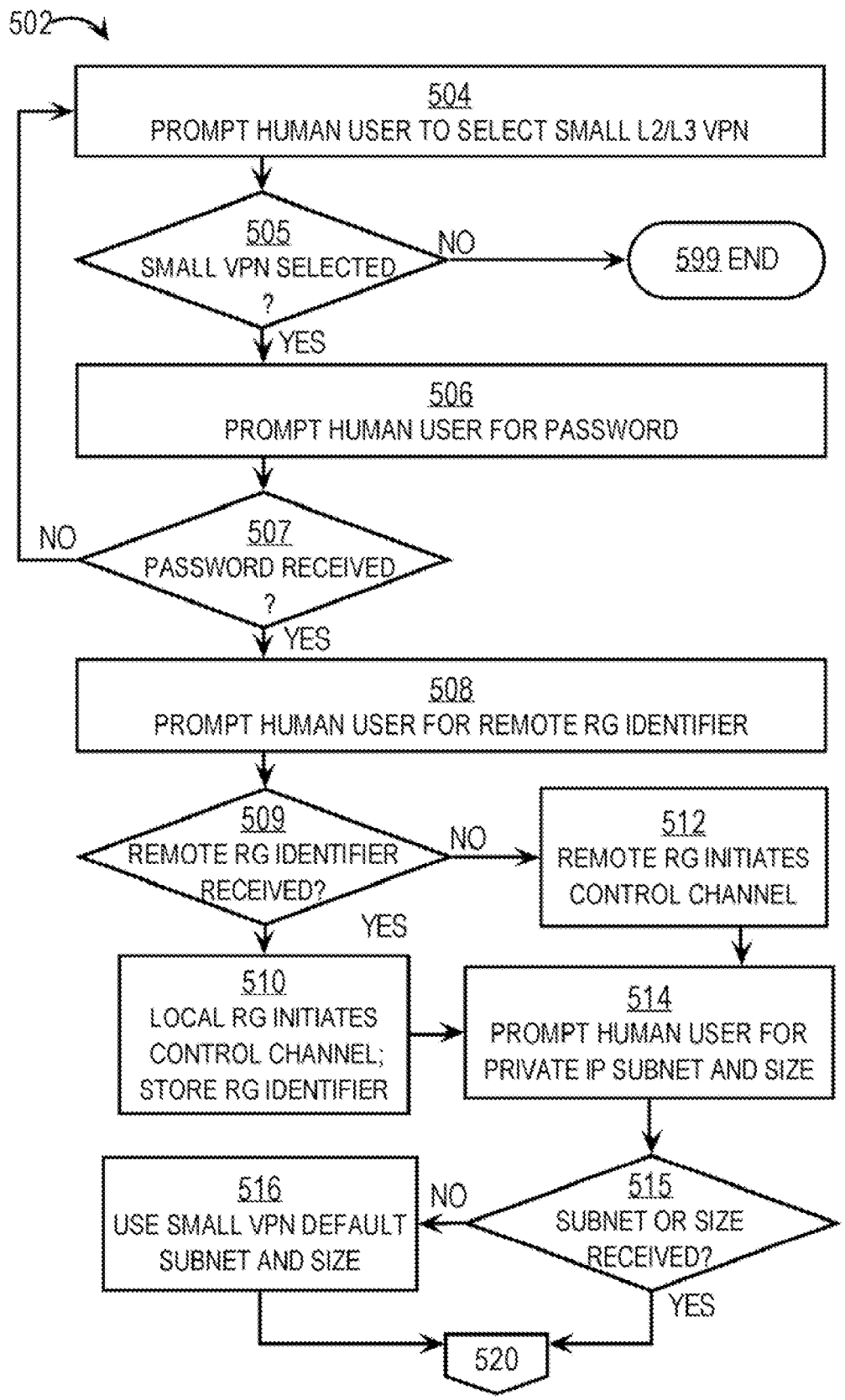
FIG. 5B illustrates example steps for a step of the method of FIG. 5A to obtain simple configuration data.

FIG. 5B illustrates example steps for a step 502 of the method of FIG. 5A to obtain simple configuration data. In step 504, a human customer is prompted to select a small L2/L3 VPN. This prompt is provided to determine whether the customer desires to establish LAN connectivity across the Internet. For example, a web client on a customer computer on LAN 152a connects to a web server process (not shown) on RG 150a. The web server process on RG 150a sends a web page to the customer computer that includes a button labeled to indicate enablement of a simple VPN, such as "Enable access to remote home/office network." In some embodiments, this web page also displays an identifier for the local RG. For example, the web page sent by the web server process on 150a displays the text "Your network gateway is 9.0.0.1."

In some embodiments, a domain name indexed by a domain name service (DNS) is used as the identifier for an RG. It is assumed for purposes of illustration that RG 150a has a domain name "Alice123.isp.com," RG 150b has a domain name "Benjamin987.com" and RG 150c does not have a domain name. In some such embodiments, the web server process on 150a displays the text "Your network gateway is Alice123.isp.com."

In step 505 it is determined whether this option to establish LAN connectivity across the Internet is selected. For example, it is determined whether the web client on the customer computer has sent a web page message that indicates the button has been activated by the customer's use of a pointing device. If not, control passes to step 599 to end the L2/L3 VPN manager process. However, if it is determined in step 505 that the option to establish LAN connectivity across the Internet is selected, control passes to step 506.

In step 506, the human customer is prompted to enter a secret password used to authenticate members of the small L2/L3 VPN. For example, the web server process on RG 150a sends a web page to the customer computer that includes a text field labeled to indicate a password, such as "Enter password shared by remote home/office network."

In step 507, it is determined whether a password has been received. For example, it is determined whether the web client on the customer computer on the LAN 152a has sent a web page message that indicates text has been typed and submitted by the customer's use of a pointing device and keyboard on the computer. In some embodiments, step 507 includes determining whether the password has an accepted format (acceptable character set and number of characters). If not, control passes back to step 504.

If, in step 507, it is determined that an acceptable password has been received, control passes to step 508. In step 508, the human customer is prompted to enter an identifier for the RG at the remote LAN, if known, so that a control channel can be established with the remote LAN. For example, the web server process on RG 150a sends a web page to the customer computer that includes a text field labeled to indicate an RG identifier such as "Enter gateway identifier for remote home/office network." In some embodiments, the web page includes the identifier for the local RG. For example, the web server process on RG 150a sends a web page to the customer computer that includes a text field labeled to indicate an RG identifier such as "Your gateway identifier is 9.0.0.1. Enter gateway identifier for remote home/office network," or "Your gateway identifier is Alice123.isp.com. Enter gateway identifier for remote home/office network." In some embodiments, the web page includes a button labeled "Don't know gateway identifier for remote home/office network."

In step 509, it is determined whether an identifier for a remote gateway has been received. For example, it is determined whether the web client on the customer computer on the LAN 152a has sent a web page message that indicates text has been typed and submitted by the customer's use of a pointing device and keyboard on the computer. In some embodiments, step 509 includes determining whether the identifier has an accepted format (acceptable character set and number of characters) for an IP address or a domain name and control passes back to step 508 if the format of the identifier is incorrect.

If it is determined, in step 509, that an identifier for a remote gateway has been received, control passes to step 510. In step 510 it determined that the method executing on the local RG initiates the control channel for establishing the pseudo wires and the identifier for the remote RG is stored, along with the identifier for the local RG, in the VPN RG list 132 on the local RG. Control then passes to step 514.

If it is determined, in step 509, that an identifier for a remote gateway has not been received, control passes to step 512. In step 512 it determined that a remote RG initiates the control channel for establishing the pseudo wires. The identifier for the local RG only is stored in the VPN RG list 132 on the local RG. Control then passes to step 514.

It is anticipated that any customer who is even a casual user of a LAN and who has decided share networked devices with another casual customer would be able to determine the gateway identifiers displayed on web pages as described above. There are other standard ways to obtain an IP address of the router that a more sophisticated user could employ. The two casual users can easily communicate with each other, such as by cellular telephone, and agree on a password to be used by both, and exchange the gateway identifiers they each learned from their own LANs. Each of those first two users could then enter a gateway identifier for the other's LAN. Since each RG learns the VPN members from the RG it establishes a control channel with, only one of the first two members of the VPN need respond with an identifier for the remote RG. Subsequent users who wish to join the VPN need only obtain the gateway identifier of one RG already in the LAN, easily done by a phone call to the customer at one remote LAN.

In step 514, the human customer is prompted to enter a private IP subnet or size or both to use as a pool for the VPN, so that the control channel can be used to negotiate distinct subnet address spaces with other members of the VPN. For example, the web server process on RG 150a sends a web page to the customer computer that includes an array of buttons to indicate subnet address pools to use for the VPN. The buttons are labeled as listed in Table 1.

TABLE 1

| Example private IPv4 address pools | |
|---|---|
| Private subnet | size (mask bits) |
| 10 | 8 |
| 10 | 16 |
| 10 | 24 |
| 192 | 8 |
| 192 | 16 |
| 192 | 24 |

In some embodiments, the web page prompts the human user to indicate whether the user even wishes to make this selection, such as a button for "Advanced options" that must be selected before the array of buttons is presented. In some embodiments, the human user is also prompted to pick values for the middle bytes for masks of 16 and 24 bits. For example, for a subnet 10 and size 16 there are 255 non-overlapping ranges that the user may select, as indicated by a value of the second octet. The user is then allowed to select one, e.g., 10.50.0.0/16, by prompting the user to enter a value between 0 and 255 in a text box. It is desirable that all LAN select private IP addresses from the same subnet (either 10.x.x.x or 192.x.x.x). Sometimes the VPN acts like a connected set of subnets, and sometimes it acts as a single subnet. The contiguous address space for the L2VPN at large is desirable for the VPN to act as a single subnet, which can be important for broadcast and link-local multicast protocols running on the a device on the LAN. The contiguous address space for the L2VPN at large is referred to as the VPN address-range, or simply the VPN address pool.

In step 515, it is determined whether subnet and size has been received. For example, it is determined whether the web client on the customer computer on the LAN 152a has sent a web page message that indicates text has been typed and submitted or a button activated by the customer's use of a pointing device and keyboard on the computer. If so, control passes to step 520 to use the selected subnet or size or both.

If it is determined, in step 515, that data indicating a subnet and size has not been received, control passes to step 516. In step 516 default values are used. For example, in an illustrated embodiment, the default is subnet 10 and mask size 8, i.e., 10.0.0.0./8. Based on the assumptions listed above, one RG uses only 255 private LP addresses and is thus using ranges of the form 10.x.x.0/24. This leaves the middle two octets (i.e., $2^{16}$ possible ranges) from which each RG can choose. If the choice is made at random, there is a very small chance that two RGs will select the same private address space. Control passes to step 520 to use the default subnet and size.

In an embodiment that is preferred because it is simpler for a user, step 514 and step 515 are omitted, and control passes directly from steps 510 and 512 to step 516 and step 520.

In step 520, depicted in FIG. 5A, a control channel is established with the remote customer RG based on the simple VPN configuration data and simple VPN assumptions. Step 520 includes selecting a private L3 address range for the local LAN at each RG. In an illustrated embodiment, a private IP range of mask size 24 is selected at random from the VPN address pool 10.0.0.0/8. For purposes of illustration, it is assumed that the selected private IP range for RG 150a is 10.7.143.0/24.

In step 540, a private address range is negotiated that does not overlap ranges of any other RG in the VPN, based on simple VPN assumptions. Step 540 includes checking the private IP address ranges of all other RG in the VPN.

Figure 5C:
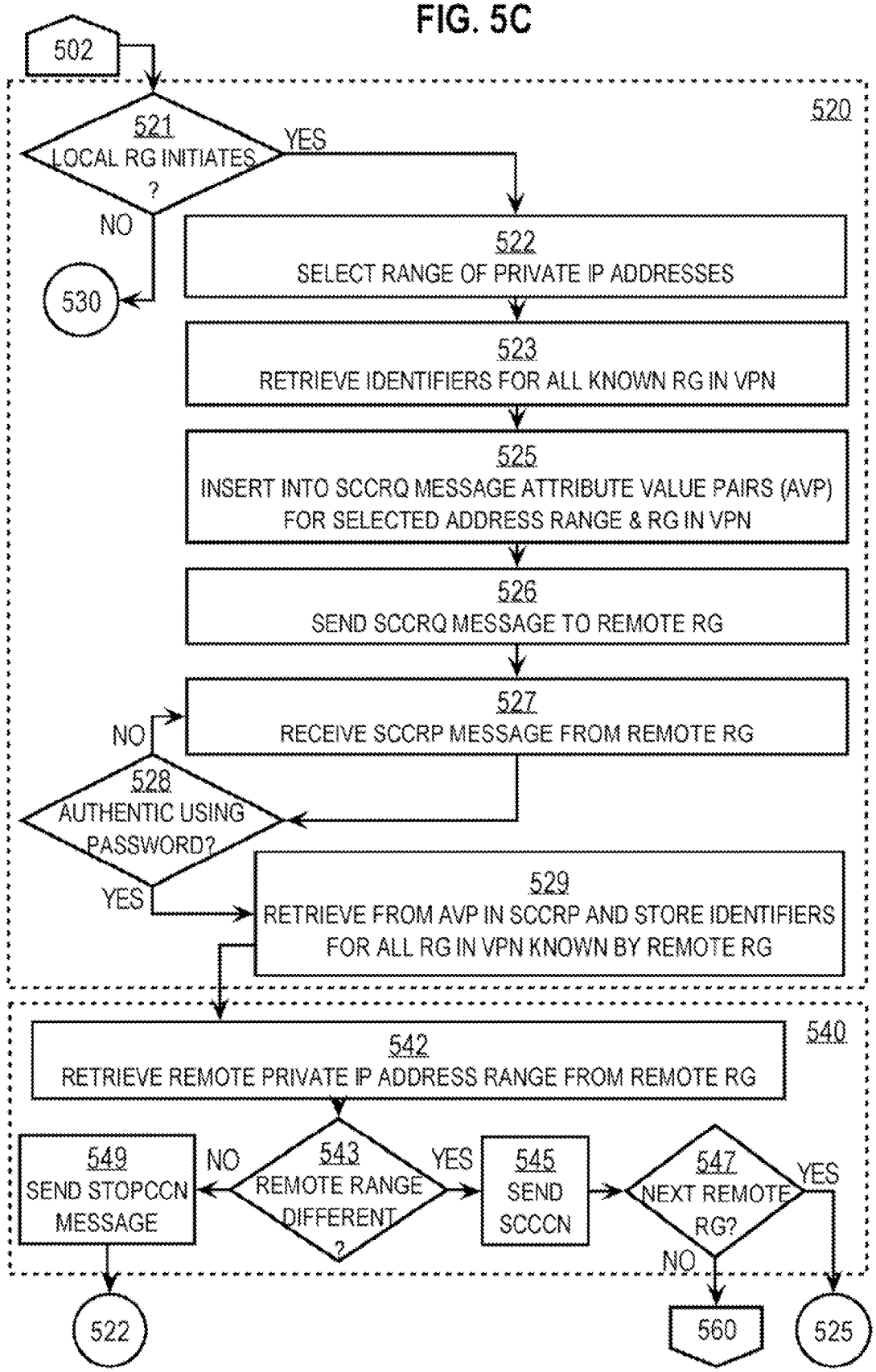
FIG. 5C and FIG. 5D illustrate example steps for two steps of the method of FIG. 5A to set up a control channel and negotiate private Internet Protocol (IP) addresses.
Figure 5D:
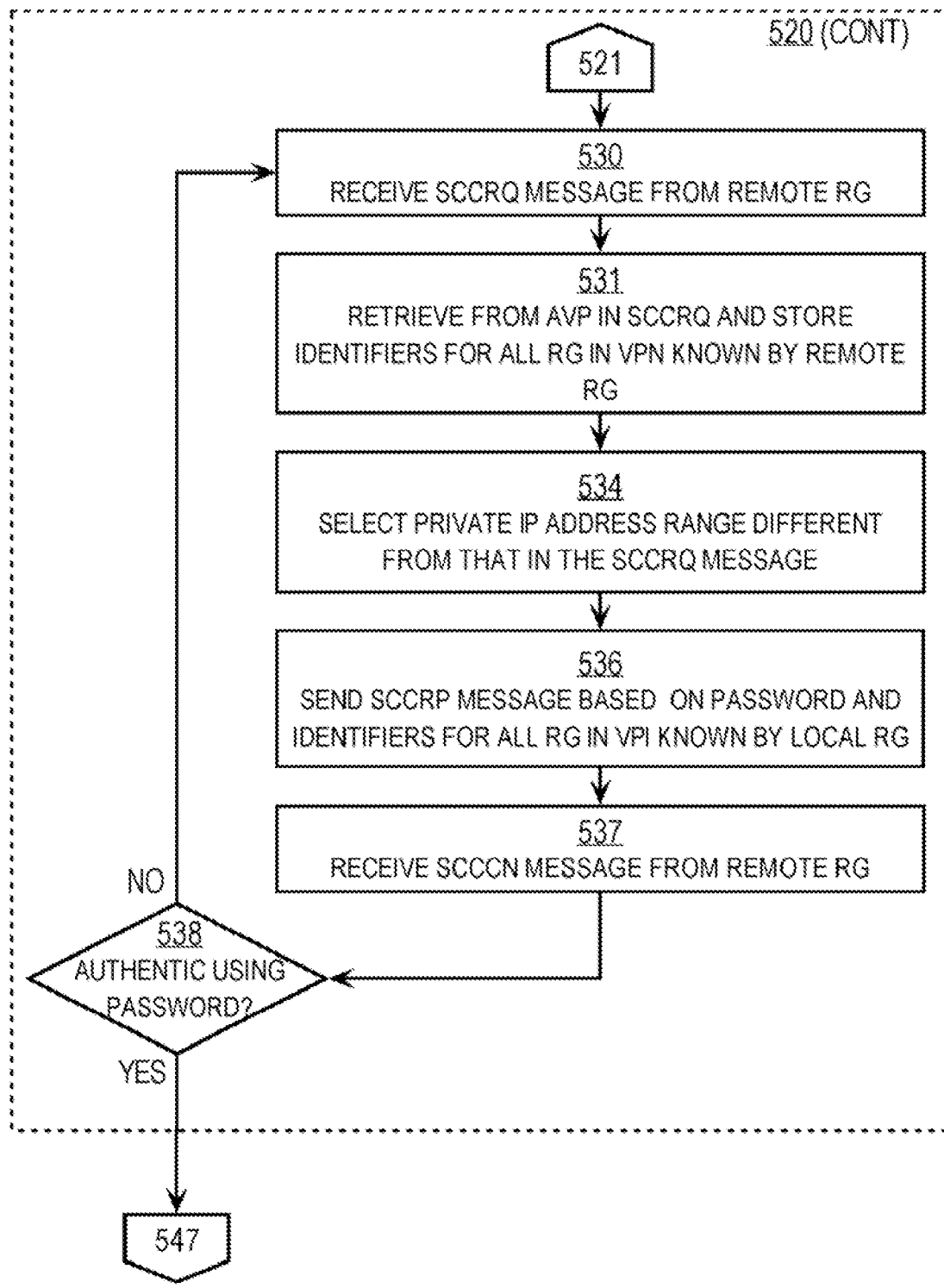

FIG. 5C and FIG. 5D illustrate example steps for two steps 520 and 540 of the method of FIG. 5A to set up a control channel and negotiate private Internet Protocol (IP) addresses. Step 520 includes steps 521 through 529 in FIG. 5C and steps 530 through 538 in FIG. 5D. Step 540 includes steps 542 through 547 in FIG. 5C.

As shown in FIG. 5C, control passes from step 502 to step 521. In step 521, it is determined whether the local RG can initiate the control channel. For example, if the local RG loses a tie-breaker process, or if no identifier for a remote RG is received during configuration step 509, then the local RG can not initiate the control channel. In this case, control passes to step 530, described in more detail later in this section, to respond to a control channel request sent by a remote RG. If it is determined in step 521 that the local RG can initiate the control channel, then control passes to step 522.

In step 522, a subnet range of private IP addresses is selected from the VPN address pool. For example, as assumed above, the subnet 10.7.143.0/24 is selected at random from the pool 10.0.0.0/8. Each such range is referred to as a site-specific subnet range, or a site address range.

In step 523, identifiers are retrieved for all RG known to be in the VPN. For example, public IP addresses 9.0.0.1 and 9.0.0.2 for RG 150a and 150b are retrieved from VPN RG list 132a.

In step 525, AVP for selected RG address range and RG in VPN are inserted into a SCCRQ message. For example, modified SCCRQ message 310 is generated at RG 150a with the values for selected fields listed in Table 2 based on the configuration data and simple VPN default values described above.

TABLE 2

Example values for modified SCCRQ message.

| Field | Value indicated |
|---|---|
| source public IP address | 9.0.0.1 |
| destination public IP address | 9.0.0.2 |
| challenge | first arbitrary value |
| Private IP address range | 10.7.143.0/24 |
| RG in VPN | 9.0.0.1; 9.0.0.2 |

In step 526, the SCCRQ message is sent over the L3 subnetwork to a remote RG in the VPN. For example, the SCCRQ message with values listed in Table 2 is sent by RG 150a over the attachment circuit to edge node 120a and, by virtue of the destination public IP address, is routed to RG 150b.

In step 527, an SCCRP message is received over the L3 subnetwork from a remote RG. It is assumed, for purposes of illustration, that a SCCRP message with values listed in Table 3 is received over the attachment circuit to edge node 120a.

TABLE 3

Example values for modified SCCRP message.

| Field | Value indicated |
|---|---|
| source public IP address | 9.0.0.2 |
| destination public IP address | 9.0.0.1 |
| response to challenge | first arbitrary value hashed with password |
| new challenge | second arbitrary value |
| Private IP address range | 10.201.5.0/24 |
| RG in VPN | 9.0.0.2 |

In step 528, it is determined whether the SCCRP message is authentic based on the password. The value in the response to challenge field 362 is compared to the value obtained locally by hashing the password received during configuration with the first arbitrary value sent in the challenge field 332 of the SCCRQ message. If they do not match, the SCCRP message is not authentic and control passes back to step 527 to await the next SCCRP message. If they do match, the SCCRP message is authentic and control passes to step 529.

In step 529, identifiers for all RG in VPN known by the remote RG are retrieved from the AVP fields and any new Identifiers are added to the local VPN RG list 132. In the example, the RG identifiers in the RG in VPN field are already stored in the local VPN RG list 132a. Control passes to step 542 of step 540.

In step 542, the private IP address range for the remote RG is retrieved. For example, the range 10.201.5.0/24 is retrieved from the SCCRP message listed in Table 3.

In step 543, it is determined whether the remote site address range is different from the local site address range selected in step 522. If not, there is a conflict and the control channel establishment is abandoned. Control passes to step 549 to send a STOPCCN message. Step 549 includes sending a STOPCCN to all remote RG in the VPN with which control channels have been established, if any. Control then passes back to step 522 to select a different range of private IP addresses.

Even with the tie-breaker option, conflicts still may occur between ranges of chosen IP addresses. In some embodiments, the public IP address of the RG is used as an unique tie-breaking value. The numerically "smaller" IP address "wins" and the loser must re-establish the L2TPv3 tunnel with ail peers, choosing a different site address range.

If it is determined, in step 543, that the remote site address range is different from the local site address range, then control passes to step 545. In step 545, the control channel with the current remote RG is finished by sending a SCCCN message 214. The SCCCN message 214 includes a response to the second challenge based on the password. Control then passes to step 547.

In step 547 it is determined whether there is a next remote RG in the VPN RG list to be checked. If so, control passes to step 525 to start a SCCRQ message for sending to the next RG in the VPN. If control channels have been set up between the local RG and all remote RG in the VPN, then negotiations are complete and control passes to step 560.

For example, when a user of LAN 152c joins the VPN, that user will configure RG 150c with the password and the identifier for at least one of RG 150a and RG 150b. It is assumed for purposes of illustration, that RG 150c is configured with the identifier 9.0.0.1 for RG 150a. It is further assumed for purposes of illustration that the site address range 10.77.123.0/24 is selected at random by the L2/L3 VPN manager process 130c on RG 150c. RG 150c sends a SCCRQ message to 150a and learns of the range 10.7.143.0/24 of RG 150a and of identifier 9.0.0.2 of RG 150b. In step 543, it is determined that the range for RG 150c is different from the range for RG 150a and control passes to step 545 to complete that control channel. In step 547, it is determined that RG 150b is still to be checked. Control passes to step 525 to start a SCCRQ message for sending to RG 150b. RG 150c sends the SCCRQ message to 150b and learns of the range 10.201.5.0/24 of RG 150b, but no further RG 150 in the VPN. In step 543, it is determined that the range for RG 150c is different from the range for RG 150b and control passes to step 545 to complete that control channel. Since there is no further RG in the VPN, control passes to step 560, described later below.

If it is determined in step 521 that the local RG can not initiate the control channel, as described above, then control passes to step 530. For purposes of illustration, it is assumed that during step 509 of an embodiment of the method 500 executing on RG 150b, or during a tie-breaker process, it is determined that RG 150b can not initiate the control channel Control passes to step 530 at RG 150b.

In step 530, a modified SCCRQ message 310 is received from a remote RG. For example, RG 150b receives the SCCRQ message of Table 2 from RG 150a.

In step 531, identifiers for all RG in VPN known by the remote RG are retrieved from the AVP fields and any new identifiers are added to the local VPN RG list 132. In the example, the RG identifier 9.0.0.1 in the RG in VPN field is added to the identifier 9.0.0.2 already stored in the local VPN RG list 132b.

In step 534, a private IP address range is selected that is different from the range in the SCCRQ message received. If the range selected is the same as that in the SCCRQ message, the local process simply makes another random selection. In other embodiments, the tie-breaker loser makes another selection. For example, the range 10.201.5.0/24 is selected.

In step 536, a modified SCCRP message 340 is sent based on the configured password and identifiers for all RG in VPI known by local RG. In the illustrated embodiment, the RG in VPN sent are those known before receipt of the SCCRQ message. For example, the SCCRP message listed in Table 3 is sent during step 536.

In step 537, a SCCCN message 214 is received.

In step 538, the SCCCN message is authenticated using the password. The value in a response to second challenge field is compared to the value obtained locally by hashing the password received during configuration with the second arbitrary value sent in the new challenge field 363 of the modified SCCRP message 340. If they do not match, the SCCCN message is not authentic and control passes back to step 530 to await the next SCCRQ message. If they do match, the SCCCN message is authentic and control passes to step 547 in step 540, described above, to check the remaining RG in the VPN, if any.

For resiliency, if an IP address changes on an RG, the L2TPv3 tunnel will timeout and restart with one of the RGs listed, re-establishing itself in the VPN and getting an updated list of last known active RGs. Control channels and pseudo wires are then established one by one with the other RGs, as described here. If tunnels go down due to an RG reset or network blackout, all RGs will periodically retry until all tunnels are brought back into the VPN (eventually giving up, based on configurable timeouts with reasonable defaults). In order to avoid race condition issues, all L2TPv3 tunnels are setup utilizing the built-in tie-breaker option to ensure that one and only one control connection is established between any two peers.

Control passes from step 540 to step 560 in FIG 5. In step 560, one or more pseudo wires (called sessions by L2TPv3) are established using the control channel. Step 560 includes exchanging incoming call messages (ICRQ message 220a, 220b, ICRP messages 222a, 222b, and ICCN messages ICCN) to set up the two pseudo wires. In the illustrated embodiment, one pseudo wire is established for L2 traffic and a second pseudo wire is established for L3 traffic with L2 headers omitted. For example, pseudo wire 140a (and a second, parallel pseudo wire, not shown) is established by RG 150a based on a control channel established between RG 150a and 150b. Pseudo wire 140c (and a second, parallel pseudo wire, not shown) is established by RG 150c based on a control channel established between RG 150c and 150a. Because RG 150c learns of RG 150b from RG 150a during control channel setup, pseudo wire 140c (and a second, parallel pseudo wire, not shown) is also established by RG 150c based on a control channel established between RG 150c and 150b.

In step 570, the private IP addresses are provided to devices on a LAN by the RG from the site address range negotiated during step 540. In the illustrated embodiment, a DHCP server executes on an RG with an IP address pool set by the negotiated site address range. For example, a DHCP server on RG 150a uses an site address pool of 10.7.143.0/24 for devices on LAN 152a, such as end node 154a. Similarly, a DHCP server on RG 150b uses a site address pool of 10.201.5.0/24 for devices on LAN 152b, such as end node 154b. Similarly, a DHCP server on RG 150c uses a site address pool of 10.77.123.0/24 for devices on LAN 152c, such as end node 154c. Each device looks at the VPN truly as a single LAN (which can be important for broadcast and link-local multicast protocols running on the host), while the RGs can still distinguish which packets are destined to which tunnel. Each RG performs a proxy address resolution protocol (ARP) on behalf of any address within the VPN address-range of other active sites, but not within its own local private IP address range. The site-facing IP address of the RG, automatically chosen from within the site-facing range, is advertised to the local LAN via DHCP as the default route for all other addresses outside the 10.x.x.x range. For such addresses, the RG performs NAT/PAT functions.

In step 580, an L2 or L3 packet is received at an RG 150 on the LAN 152 that is for forwarding to a remote LAN. Any method for forwarding may be used. For example, an L2 broadcast destination is indicated in an L2 header, such as in an L2 discovery message. As another example, an L3 broadcast destination is indicated in an L3 header, such as in an L3 discovery message. Alternatively, an L3 header destination field holds data that indicates a private IP address in a site address range selected by a particular remote LAN. Similarly, a L2 header destination field holds data that indicates a MAC value learned from tunneled messages received on a pseudo wire from a particular remote LAN.

In step 582, the data packet received on the LAN 152 is bridged or routed in a tunnel packet sent over an appropriate pseudo wire 140 through an attachment circuit with an edge node 120. MAC addresses at the local LAN are learned by the remote RG from the L2 header in the tunneled payload.

In step 590, a tunnel packet is received at an RG 150 on a pseudo wire 140 from a remote LAN 152 through an attachment circuit with an edge node 120.

In step 592 the tunneled payload is extracted from the tunnel packet. Depending on the pseudo wire, as indicated by the port field 433, the tunneled payload is placed on the local LAN 152. When the port field 433 indicates a tunneled L2 packet, the tunneled payload is placed directly on the local LAN 152. MAC addresses at the remote LAN are learned from the L2 header in the tunneled payload. When the port field 433 indicates a tunneled L3 packet, an L2 header is generated and appended in front of the tunneled payload and the combined packet is placed on the local LAN 152.

Thus, IP packets destined for peer sites flow to the RG to be tunneled to their proper site as IP in L2TPv3 packets. Local unicast IP packets stay on the specific site and are not tunneled to other sites. Multicast link-local IP packets are flooded to all other sites. Internet destined packets are routed through the RG/NAT. This alone allows for simple IP-to-IP between consenting sites and to the Internet, without requiring application-specific port-forwarding to be configured. For example, two Macintosh computers at two different sites would be able to find one another using the default Bonjour protocol (which utilizes link-local IP multicast) and stream iTunes to one another over the L3 pseudo wire without any additional application-specific configuration at the RGs. Further, printers and PCs which use IP for discovery and communication would easily find one another for sharing, just as if they were on the same LAN.

In order to complete the illusion of a single LAN across multiple sites, non-IP-based protocols are supported as well. This includes older Windows and DOS based file and printer sharing that rely on NETBEUI, as well as proprietary protocols that operate between PVRs, Game Consoles, etc. For these protocols, the RG tunnels entire Ethernet frames over L2 pseudo wires, learns MAC addresses, and Hoods to all RGs on unknown addresses, among others techniques known in L2 tunneling.

5.0 Implementation Mechanisms—Hardware Overview

FIG. 6 illustrates a computer system 600 upon which an embodiment of the invention may be implemented. The preferred embodiment is implemented using one or more computer programs running on a network element such as a router device. Thus, in this embodiment, the computer system 600 is a router.

Computer system 600 includes a communication mechanism such as a bus 610 for passing information between other infernal and external components of the computer system 600. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). A sequence of binary digits constitutes digital data that is used to represent a number or code for a character. A bus 610 includes many parallel conductors of information so that information is transferred quickly among devices coupled to the bus 610. One or more processors 602 for processing information are coupled with the bus 610. A processor 602 performs a set of operations on information. The set of operations include bringing information in from the bus 610 and placing information on the bus 610. The set of operations also typically include comparing two or more units of information, shifting positions of units of information, and combining two or more units of information, such as by addition or multiplication. A sequence of operations to be executed by the processor 602 constitute computer instructions.

Computer system 600 also includes a memory 604 coupled to bus 610. The memory 604, such as a random access memory (RAM) or other dynamic storage device, stores information including computer instructions. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of computer instructions. The computer system 600 also includes a read only memory (ROM) 606 or other static storage device coupled to the bus 610 for storing static information, including instructions, that is not changed by the computer system 600. Also coupled to bus 610 is a non-volatile (persistent) storage device 608, such as a magnetic disk or optical disk, for storing information, including instructions, that persists even when the computer system 600 is turned off or otherwise loses power.

The term computer-readable medium is used herein to refer to any medium that participates in providing information to processor 602, including instructions for execution. Such a medium may take many forms, including, but not limited to, non-volatile media, volatile media and transmission media. Non-volatile media include, for example, optical or magnetic disks, such as storage device 608. Volatile media include, for example, dynamic memory 604. Transmission media include, for example, coaxial cables, copper wire, fiber optic cables, and waves that travel through space without wires or cables, such as acoustic waves and electromagnetic waves, including radio, optical and infrared waves. Signals that are transmitted over transmission media are herein called carrier waves.

Common forms of computer-readable media include, for example, a floppy disk, a flexible disk, a hard disk, a magnetic tape or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read.

Information, including instructions, is provided to the bus 610 for use by the processor from an external terminal 612, such as a terminal with a keyboard containing alphanumeric keys operated by a human user, or a sensor. A sensor detects conditions in its vicinity and transforms those detections into signals compatible with the signals used to represent information in computer system 600. Other external components of terminal 612 coupled to bus 610, used primarily for interacting with humans, include a display device, such as a cathode ray tube (CRT) or a liquid crystal display (LCD) or a plasma screen, for presenting images, and a pointing device, such as a mouse or a trackball or cursor direction keys, for controlling a position of a small cursor image presented on the display and issuing commands associated with graphical elements presented on the display of terminal 612. In some embodiments, terminal 612 is omitted.

Computer system 600 also includes one or more instances of a communications interface 670 coupled to bus 610. Communication interface 670 provides a two-way communication coupling to a variety of external devices that operate with their own processors, such as printers, scanners, external disks, and terminal 612. Firmware or software running in the computer system 600 provides a terminal interface or character-based command interface so that external commands can be given to the computer system. For example, communication interface 670 may be a parallel port or a serial port such as an RS-232 or RS-422 interlace, or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments., a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends and receives electrical, acoustic or electromagnetic signals, including infrared and optical signals, which carry information streams, such as digital data. Such signals are examples of carrier waves In the illustrated embodiment, special purpose hardware, such as an application specific integrated circuit (IC) 620, is coupled to bus 610. The special purpose hardware is configured to perform operations not performed by processor 602 quickly enough for special purposes. Examples of application specific ICs include graphics accelerator cards for generating images for display, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware. Logic encoded in one or more tangible media includes one or both of computer instructions and special purpose hardware.

In the illustrated computer used as a router, the computer system 600 includes switching system 630 as special purpose hardware for switching information for flow over a network. Switching system 630 typically includes multiple communications interfaces, such as communications interface 670, for coupling to multiple other devices. In general, each coupling is with a network link 632 that is connected to another device in or attached to a network, such as local network 680 in the illustrated embodiment, to which a variety of external devices with their own processors are connected. In some embodiments an input interface or an output interface or both are linked to each of one or more external network elements. Although three network links 632a, 632b, 632c are included in network links 632 in the illustrated embodiment, in other embodiments, more or fewer links are connected to switching system 630. Network links 632 typically provides information communication through one or more networks to other devices that use or process the information. For example, network link 632b may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690. A computer called a server 692 connected to the Internet provides a service in response to information received over the Internet. For example, server 692 provides routing information for use with switching system 630.

The switching system 630 includes logic and circuitry configured to perform switching functions associated with passing information among elements of network 680, including passing information received along one network link, e.g 632a, as output on the same or different network link, e.g., 632c. The switching system 630 switches information traffic arriving on an input interface to an output interface according to pre-determined protocols and conventions that are well known. In some embodiments, switching system 630 includes its own processor and memory to perform some of the switching functions in software. In some embodiments, switching system 630 relies on processor 602, memory 604, ROM 606, storage 608, or some combination, to perform one or more switching functions in software. For example, switching system 630, in cooperation with processor 604 implementing a particular protocol, can determine a destination of a packet of data arriving on input interface on link 632a and send it to the correct destination using output interface on link 632c. The destinations may include host 682, server 692, other terminal devices connected to local network 680 or Internet 690, or other routing and switching devices in local network 680 or Internet 690.

The invention is related to the use of computer system 600 for implementing the techniques described herein. According to one embodiment of the invention, those techniques are performed by computer system 600 in response to processor 602 executing one or more sequences of one or more instructions contained in memory 604. Such instructions, also called software and program code, may be read into memory 604 from another computer-readable medium such as storage device 608. Execution of the sequences of instructions contained in memory 604 causes processor 602 to perform the method steps described herein. In alternative embodiments, hardware, such as application specific integrated circuit 620 and circuits in switching system 630, may be used in place of or in combination with software to implement the invention. Thus, embodiments of the invention are not limited to any specific combination of hardware and software.

The signals transmitted over network link 632 and other networks through communications interfaces such as interface 670, which carry information to and from computer system 600, are example forms of carrier waves. Computer system 600 can send and receive information, including program code, through the networks 680, 690 among others, through network links 632 and communications interfaces such as interface 670. In an example using the Internet 690, a server 692 transmits program code for a particular application, requested by a message sent from computer 600, through Internet 690, ISP equipment 684, local network 680 and network link 632b through communications interface in switching system 630. The received code may be executed by processor 602 or switching system 630 as it is received, or may be stored in storage device 608 or other non-volatile storage for later execution, or both. In this manner, computer system 600 may obtain application program code in the form of a carrier wave.

Various forms of computer readable media may be involved in carrying one or more sequence of instructions or data or both to processor 602 for execution. For example, instructions and data may initially be carried on a magnetic disk of a remote computer such as host 682. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to an infra-red signal, a carrier wave serving as the network link 632b. An infrared detector serving as communications interface in switching system 630 receives the instructions and data carried in the infrared signal and places information representing the instructions and data onto bus 610. Bus 610 carries the information to memory 604 from which processor 602 retrieves and executes the instructions using some of the data sent with the instructions. The instructions and data received in memory 604 may optionally be stored on storage device 608, either before or after execution by the processor 602 or switching system 630.

6.0 Extensions and Alternatives

In the foregoing specification, the invention has been described with reference to specific embodiments thereof. It will, however, be evident, that various modifications and changes may be made thereto without departing from the broader spirit and scope of the invention. The specification and drawings are, accordingly, to be regarded in an illustrative rather than a restrictive sense.

What is claimed is:

1. A method comprising:
   negotiating over a control channel to establish a first set of private L3 addresses for a first LAN and a second set of private L3 addresses for a second LAN, wherein a first gateway node sends to a second gateway node virtual private network (VPN) membership data that indicates a public L3 address for each gateway node that previously negotiated with the first gateway node;
   communicating over the control channel to establish a first pseudo wire between the gateway nodes for exchanging Ethernet traffic, and to establish a second pseudo wire between the gateway nodes for exchanging IP traffic;
   providing a different private L3 address for each different end node in the first and second LANs from the first and second sets of private L3 addresses, respectively;
   receiving at the first gateway node from the first LAN a discovery packet that requests one or both of an identifier or a service associated with nodes on the first LAN;
   encapsulating the discovery packet in a tunnel packet with a destination L3 address that corresponds to a second public L3 address;
   sending the tunnel packet over a wide area network, whereby the tunnel packet is delivered to the second gateway node and the discovery packet is extracted from the tunnel packet, wherein the second gateway node is configured to send the discovery packet over the second LAN;
   receiving at the first gateway node from the second gateway node a tunnel packet that encapsulates a second discovery packet that requests identifiers of nodes on the first LAN for discovering activities for nodes on the second LAN;
   extracting the second discovery packet; and
   sending the second discovery packet over the first LAN such that a particular one of the identifiers is used to establish a communication session between the first and second LANs.

2. A method as recited in claim 1, wherein establishing the control channel further comprises:
   receiving, at the first gateway node, the configuration data that contains
      the secret data that indicates a password for a single virtual private network (VPN) over the wide area network that connects a plurality of local area networks, and
      the identifier that indicates the second public L3 address of the second gateway node, wherein the second gateway node is either already a member of the single VPN or one of a first two gateway nodes in the single VPN.

3. A method as recited in claim 1, wherein establishing the control channel further comprises:
   receiving, at the first gateway node, the configuration data that contains the secret data that indicates a password for a single virtual private network (VPN) over the wide area network that connects a plurality of local area networks;
   receiving a configuration data packet that includes the identifier that indicates the second public L3 address of the second gateway node, wherein the second gateway node is either already a member of the single VPN or one of a first two gateway nodes in the single VPN.

4. A method as recited in claim 1, wherein negotiating with the second gateway node further comprises:
   receiving from the second gateway node virtual private network (VPN) membership data that indicates a public L3 address for each gateway node that previously negotiated with the second gateway node; and
   establishing the first set of private L3 addresses for the first LAN wherein no address in the first set of private L3 addresses is also in a set of private addresses of a gateway node indicated by the VPN membership data.

5. A method as recited in claim 1, wherein negotiating with the second gateway node further comprises:
   establishing the second set of private L3 addresses for the second LAN wherein no address in the second set of private L3 addresses is also in a set of private addresses of a gateway node indicated by the VPN membership data.

6. A method as recited in claim 1, wherein the discovery packet is a data-link layer (L2) discovery packet.

7. A method as recited in claim 1, wherein the discovery packet is a L3 discovery packet.

8. A method as recited in claim 1, further comprising associating a media access control (MAC) identifier in a data-link layer (L2) source address of the second discovery packet with the second public L3 address.

9. A method as recited in claim 8, further comprising bridging L2 data packets, including:
   receiving at the first gateway node from the first LAN a L2 data packet that includes a destination MAC identifier in a L2 layer destination address and does not include an internetwork-layer header data;
   determining whether the destination MAC identifier is associated with the second public L3 address; and
   if it is determined that the destination MAC identifier is associated with the second public L3 address, then performing:
      encapsulating the L2 data packet in a second tunnel packet with a destination L3 address that indicates the second public L3 address; and
      sending the second tunnel packet over the wide area network, whereby the tunnel packet is delivered to the second gateway node and the L2 data packet is extracted from the tunnel packet, wherein the second gateway node is configured to send the L2 data packet over the second LAN.

10. A method as recited in claim 1, further comprising routing L3 data packets including:
   receiving at the first gateway node from the first LAN a L3 data packet that includes a destination L3 address;
   determining whether the destination L3 address is in the second set of private L3 addresses; and
   if it is determined that the destination L3 address is in the second set of private L3 addresses, then performing:
      encapsulating the internetwork-layer data packet in a second tunnel packet with a destination L3 address that indicates the second public L3 address; and
      sending the second tunnel packet over the wide area network, whereby the tunnel packet is delivered to the second gateway node and the L3 data packet is extracted from the tunnel packet,
   wherein the second gateway node is configured to send the L3 data packet over the second LAN.

11. A method as recited in claim 1, wherein the first gateway node is at customer premises different from premises of a provider that provides access to the wide area network.

12. A method as recited in claim 11, wherein the second gateway node is at different second customer premises different from the premises of the provider.

13. A method as recited in claim 1, wherein:
   establishing the control channel further comprises establishing a layer 2 tunneling protocol version 3 (L2TPv3) control channel; and
   encapsulating the discovery packet in a tunnel packet further comprises encapsulating the discovery packet in an L2TPv3 packet.

14. A method as recited in claim 13, further comprising:
   establishing a first L2TPv3 session for tunneling data packets that include a L3 header that includes a destination address that indicates a private network address from the second set; and
   establishing a different second L2TPv3 session for tunneling data-link layer (L2) data packets that do not include a L3 header.

15. A method as recited in claim 14, wherein:
   the method further comprises determining whether the discovery packet includes a L3 header that includes a destination address that indicates a private network address from the second set; and
   if it is determined that the discovery packet includes a L3 header, then encapsulating the discovery packet further comprises
      encapsulating the discovery packet in a tunnel packet for the first L2TPv3 session, and
      excluding a L2 header in the packet from the tunnel packet.

16. A method as recited in claim 14, further comprising:
   receiving at the first gateway node from the first LAN the data packet;
   determining whether the data packet includes a L3 header that includes a destination address that indicates a private network address from the second set; and
   if it is determined that the data packet includes a L3 header, then encapsulating the L3 header and L3 payload of the data packet in a new tunnel packet for the first L2TPv3 session by excluding a L2 header of the data packet from the tunnel packet; and
   sending the new tunnel packet over the wide area network.

17. An apparatus comprising:
   a first network interface that is configured for communicating a data packet with a first packet-switched local area network (LAN);
   a second network interface that is configured for communicating a data packet with a packet-switched wide area network, which second network interface has a first public internetwork layer (L3) address;
   one or more processors;
   one or more computer-readable media; and
   software encoded in the one or more computer-readable media and, when executed on the one or more processors, operable for:
      negotiating over a control channel to establish a first set of private L3 addresses for the first LAN and a second set of private L3 addresses for the second LAN, wherein a first gateway node sends to a second gateway node virtual private network (VPN) membership data that indicates a public L3 address for each gateway node that previously negotiated with the first gateway node;
      communicating over the control channel to establish a first pseudo wire between the gateway nodes for exchanging Ethernet traffic, and to establish a second pseudo wire between the gateway nodes for exchanging IP traffic;
      providing a different private L3 address for each different end node in the first and second LANs from the first and second sets of private L3 addresses, respectively;
      receiving at the first gateway node from the first LAN a discovery packet that requests one or both of an identifier or a service associated with nodes on the first LAN;
      encapsulating the discovery packet in a tunnel packet with a destination L3 address that corresponds to a second public L3 address;
      sending the tunnel packet over the wide area network, whereby the tunnel packet is delivered to the second gateway node and the discovery packet is extracted from the tunnel packet, wherein the second gateway node is configured to send the discovery packet over the second LAN;
      receiving at the first gateway node from the second gateway node a tunnel packet that encapsulates a second discovery packet that requests identifiers of nodes on the first LAN for discovering activities for nodes on the second LAN;
      extracting the second discovery packet; and
      sending the second discovery packet over the first LAN such that a particular one of the identifiers is used to establish a communication session between the first and second LANs.

18. An apparatus as recited in claim 17, wherein establishing the control channel further comprises:
   receiving the configuration data that contains
      the secret data that indicates a password for a single virtual private network (VPN) over the wide area network that connects a plurality of local area networks, and
      the identifier that indicates the second public L3 address of the different apparatus, wherein the different apparatus is either already a member of the single VPN or one of a first two nodes in the single VPN.

19. An apparatus as recited in claim 17, wherein establishing the control channel further comprises:
   receiving the configuration data that contains the secret data that indicates a password for a single virtual private network (VPN) over the wide area network that connects a plurality of local area networks;

receiving a configuration data packet that includes the identifier that indicates the second public L3 address of the different apparatus, wherein the different apparatus is either already a member of the single VPN or one of a first two nodes in the single VPN.

20. An apparatus as recited in claim 17, wherein negotiating with the different apparatus further comprises:
receiving through the second network interface from the different apparatus virtual private network (VPN) membership data that indicates a public L3 address for each node that previously negotiated with the different apparatus; and
establishing the first set of private L3 addresses for the first LAN wherein no address in the first set of private L3 addresses is also in a set of private addresses of a node indicated by the VPN membership data.

21. An apparatus as recited in claim 17, wherein negotiating with the different apparatus further comprises:
establishing the second set of private L3 addresses for the second LAN wherein no address in the second set of private L3 addresses is also in a set of private addresses of a node indicated by the VPN membership data.

22. An apparatus as recited in claim 17, wherein the discovery packet is a data-link layer (L2) discovery packet.

23. An apparatus as recited in claim 17, wherein the discovery packet is a L3 discovery packet.

24. An apparatus as recited in claim 17, wherein the software, when executed on the one or more processors, is further operable for associating a media access control (MAC) identifier in a data-link layer (L2) source address of the second discovery packet with the second public L3 address.

25. An apparatus as recited in claim 24, wherein the software, when executed on the one or more processors, is further operable for bridging L2 data packets, including:
receiving through the first network interface a L2 data packet that includes a destination MAC identifier in a L2 layer destination address and does not include L3 header data;
determining whether the destination MAC identifier is associated with the second public L3 address; and
if it is determined that the destination MAC identifier is associated with the second public L3 address, then performing:
encapsulating the L2 data packet in a second tunnel packet with a destination L3 address that indicates the second public L3 address; and
sending the second tunnel packet through the second network interface, whereby the tunnel packet is delivered to the different apparatus and the L2 layer data packet is extracted from the tunnel packet,
wherein the different apparatus is configured to send the L2 data packet over the second LAN.

26. An apparatus as recited in claim 17, wherein the software, when executed on the one or more processors, is further operable for routing L3 data packets, including:
receiving through the first network interface a L3 data packet that includes a destination L3 address;
determining whether the destination L3 address is in the second set of private L3 addresses; and
if it is determined that the destination L3 address is in the second set of private L3 addresses, then performing:
encapsulating the L3 data packet in a second tunnel packet with a destination L3 address that indicates the second public L3 address; and
sending the second tunnel packet through the second network interface, whereby the tunnel packet is delivered to the different apparatus and the L3 data packet is extracted from the tunnel packet,
wherein the different apparatus is configured to send the L3 data packet over the second LAN.

27. An apparatus as recited in claim 17, wherein the apparatus is at customer premises different from premises of a provider that provides access to the wide area network.

28. An apparatus as recited in claim 27, wherein the different apparatus is at different second customer premises different from the premises of the provider.

29. An apparatus as recited in claim 17, wherein:
establishing the control channel further comprises establishing a layer 2 tunneling protocol version 3 (L2TPv3) control channel; and
encapsulating the discovery packet in a tunnel packet further comprises encapsulating the discovery packet in an L2TPv3 packet.

30. An apparatus as recited in claim 29, wherein the software, when executed on the one or more processors, is further operable for:
establishing a first L2TPv3 session for tunneling data packets that include a L3 header that includes a destination address that indicates a private network address from the second set; and
establishing a different second L2TPv3 session for tunneling data-link layer (L2) data packets that do not include a L3 header.

31. An apparatus as recited in claim 30, wherein:
the software, when executed on the one or more processors, is further operable for determining whether the discovery packet includes a L3 header that includes a destination address that indicates a private network address from the second set; and
if it is determined that the discovery packet includes a L3 header, then encapsulating the discovery packet further comprises
encapsulating the discovery packet in a tunnel packet for the first L2TPv3 session, and
excluding a L2 header in the packet from the tunnel packet.

32. An apparatus as recited in claim 30, wherein the software, when executed on the one or more processors, is further operable for:
receiving through the first network interface the data packet;
determining whether the data packet includes a L3 header that includes a destination address that indicates a private network address from the second set; and
if it is determined that the data packet includes a L3 header, then encapsulating the L3 header and L3 payload of the data packet in a new tunnel packet for the first L2TPv3 session by excluding a L2 header of the data packet from the tunnel packet; and
sending the new tunnel packet through the second network interface.

* * * * *